US010928948B2

(12) United States Patent
Lee et al.

(10) Patent No.: US 10,928,948 B2
(45) Date of Patent: Feb. 23, 2021

(54) USER TERMINAL APPARATUS AND CONTROL METHOD THEREOF

(71) Applicant: Samsung Electronics Co., Ltd., Suwon-si (KR)

(72) Inventors: Il-ho Lee, Suwon-si (KR); Dae-myung Kim, Hwaseong-si (KR); Youn-ho Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 15/215,156

(22) Filed: Jul. 20, 2016

(65) Prior Publication Data
US 2017/0199614 A1 Jul. 13, 2017

(30) Foreign Application Priority Data

Jan. 7, 2016 (KR) .................. 10-2016-0001843

(51) Int. Cl.
*G06F 3/041* (2006.01)
*G06F 3/0488* (2013.01)
(Continued)

(52) U.S. Cl.
CPC ............ *G06F 3/0416* (2013.01); *G06F 3/044* (2013.01); *G06F 3/045* (2013.01); *G06F 3/0412* (2013.01);
(Continued)

(58) Field of Classification Search
CPC .... G06F 3/0416; G06F 3/0412; G06F 3/0414; G06F 3/044; G06F 3/045; G06F 3/04845;
(Continued)

(56) References Cited

U.S. PATENT DOCUMENTS 8,219,152 B2 7/2012 Oh et al.
2006/0232573 A1* 10/2006 Nitta .................. G06F 16/9577
345/204
(Continued)

FOREIGN PATENT DOCUMENTS

EP 2 763 011 A 8/2014
JP 2013-073330 A 4/2013
(Continued)

OTHER PUBLICATIONS

Korean Office Action dated Nov. 19, 2019, issued in Korean Patent Application No. 10-2016-0001843.
(Continued)

*Primary Examiner* — Kent W Chang
*Assistant Examiner* — Sujit Shah
(74) *Attorney, Agent, or Firm* — Jefferson IP Law, LLP

(57) ABSTRACT

A user terminal apparatus is provided. The user terminal apparatus includes a display configured to include a main display area disposed on a front surface of the user terminal apparatus and a sub display area extending from a side of the main display area to be disposed in at least one area of a back surface of the user terminal apparatus, a processor electrically connected to the display, and a memory electrically connected to the processor. The memory stores instructions, which when executed by the processor, cause the processor to control to perform a first function of an application in response to a touch interaction being sensed on the main display area and a second function of the application in response to a touch interaction being sensed on the sub display area in response to the application being executed.

25 Claims, 38 Drawing Sheets

(51) Int. Cl.
  *G06F 3/044* (2006.01)
  *G06F 3/045* (2006.01)
  *G06F 3/0484* (2013.01)
  *G06F 3/0485* (2013.01)
  *G06F 3/0354* (2013.01)

(52) U.S. Cl.
  CPC .......... *G06F 3/0414* (2013.01); *G06F 3/0485* (2013.01); *G06F 3/04845* (2013.01); *G06F 3/04883* (2013.01); *G06F 3/04886* (2013.01); *G06F 3/03545* (2013.01); *G06F 2203/04101* (2013.01); *G06F 2203/04102* (2013.01); *G06F 2203/04105* (2013.01); *G06F 2203/04106* (2013.01)

(58) Field of Classification Search
  CPC ............... G06F 3/0485; G06F 3/04883; G06F 3/04886; G06F 3/03545; G06F 2203/04101; G06F 2203/04102; G06F 2203/04105; G06F 2203/04106
  USPC .................................................. 345/173–174
  See application file for complete search history.

(56) References Cited

U.S. PATENT DOCUMENTS

| | | | | |
|---|---|---|---|---|
| 2010/0056220 A1* | 3/2010 | Oh | ......................... | G06F 1/1616 455/566 |
| 2010/0117975 A1* | 5/2010 | Cho | ......................... | G06F 1/1626 345/173 |
| 2010/0321319 A1* | 12/2010 | Hefti | .................... | G06F 3/04883 345/173 |
| 2011/0050975 A1* | 3/2011 | Chung | .................. | G06F 1/1624 348/333.02 |
| 2012/0071208 A1* | 3/2012 | Lee | ........................ | G06F 3/0482 455/566 |
| 2012/0081307 A1* | 4/2012 | Sirpal | ................... | G06F 1/1616 345/173 |
| 2012/0081308 A1* | 4/2012 | Sirpal | ................... | G06F 1/1641 345/173 |
| 2012/0081310 A1* | 4/2012 | Schrock | ................ | G06F 3/0488 345/173 |
| 2013/0212535 A1* | 8/2013 | Kim | ....................... | G06F 3/0482 715/841 |
| 2013/0300697 A1* | 11/2013 | Kim | ....................... | G06F 1/1626 345/173 |
| 2014/0009415 A1 | 1/2014 | Nishida | | |
| 2014/0068494 A1* | 3/2014 | Petersen | ............. | H04M 1/7253 715/778 |
| 2014/0201653 A1 | 7/2014 | Han et al. | | |
| 2014/0210744 A1* | 7/2014 | Song | ...................... | G06F 3/03545 345/173 |
| 2014/0232653 A1* | 8/2014 | Yagihashi | ............. | G06F 3/0416 345/158 |
| 2014/0321072 A1* | 10/2014 | Cavallaro | .............. | H05K 1/028 361/749 |
| 2015/0015511 A1 | 1/2015 | Kwak et al. | | |
| 2015/0077358 A1* | 3/2015 | Wang | ..................... | G06K 9/222 345/173 |
| 2015/0143276 A1* | 5/2015 | Luo | ........................ | G06F 1/1626 715/773 |
| 2015/0338988 A1* | 11/2015 | Lee | ........................ | G06F 1/1613 345/173 |

FOREIGN PATENT DOCUMENTS

| | | |
|---|---|---|
| JP | 2014-029673 A | 2/2014 |
| JP | 2015-118373 A | 6/2015 |
| KR | 10-2010-0027866 A | 3/2010 |
| KR | 10-2012-0029724 A | 3/2012 |
| WO | 2015/071820 A1 | 5/2015 |

OTHER PUBLICATIONS

Korean Notice of Decision of Rejection dated May 22, 2020, issued in Korean Patent Application No. 10-2016-0001843.

\* cited by examiner

FIG. 9A    FIG. 9B    FIG. 9C
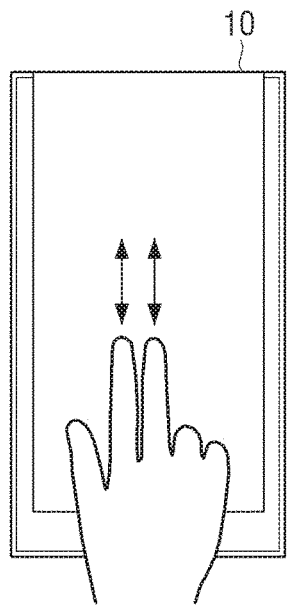 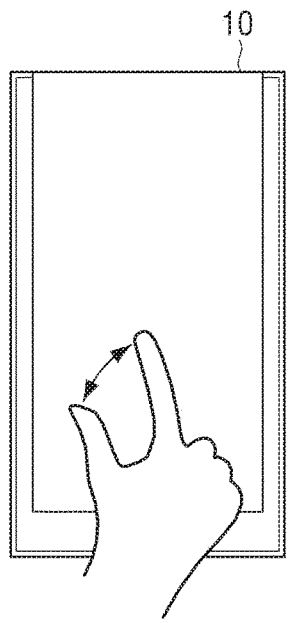 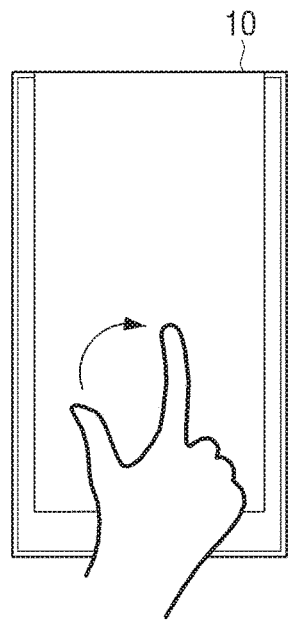
FIG. 9D    FIG. 9E
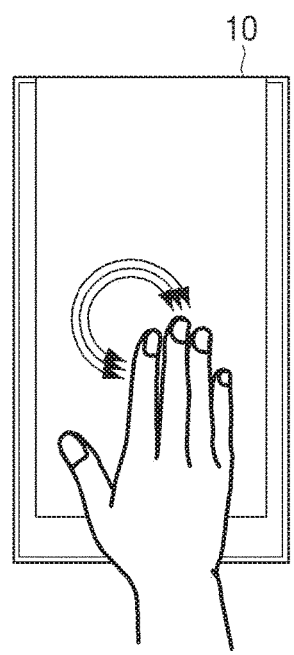 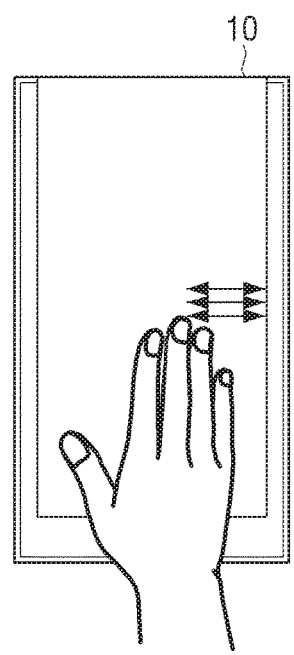

USER TERMINAL APPARATUS AND CONTROL METHOD THEREOF

CROSS-REFERENCE TO RELATED APPLICATION(S)

This application claims the benefit under 35 U.S.C. § 119(a) of a Korean patent application filed on Jan. 7, 2016 in the Korean Intellectual Property Office and assigned Serial number 10-2016-0001843, the entire disclosure of which is hereby incorporated by reference.

TECHNICAL FIELD

The present disclosure relates to a user terminal apparatus and a control method thereof. More particularly, the present disclosure relates to a user terminal apparatus that provides various types of touch interactions, and a control method thereof.

BACKGROUND

Due to development of electronic technology, various types of electronic apparatuses have been used in various fields. In particular, a half round display apparatus where a display extends to a back surface of the half round display apparatus through out-bending has been developed.

Also, a latest electronic apparatus including a display having a touch function has been launched. Therefore, different from an existing electronic apparatus that is controlled by using a front display, the half round display apparatus may be controlled through a back display.

As a result, there is a need for methods of securing various capabilities for a user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user terminal apparatus that provides various types of touch interactions by using displays disposed on front and back surfaces of the user terminal apparatus, and a control method thereof.

In accordance with an aspect of the present disclosure, a user terminal apparatus is provided. The user terminal apparatus includes a display configured to comprise a main display area disposed on a front surface of the user terminal apparatus and a sub display area extending from a side of the main display area to be disposed in at least one area of a back surface of the user terminal apparatus, a processor configured to perform a first function of an application in response to a touch interaction being sensed on the main display area in response to the application being executed and perform a second function of the application in response to a touch interaction being sensed on the sub display area in response to the application being executed.

In accordance with another aspect of the present disclosure, a method of controlling a user terminal apparatus including a display configured to comprise a main display disposed on a front surface of the user terminal apparatus and a sub display area extending from a side of the main display area to be disposed in at least one area of a back surface of the user terminal apparatus, is provided. The method includes sensing a touch interaction with at least one of the main display area and the sub display area in response to an application being executed, and performing a first function of the application in response to the touch interaction being sensed on the main display area and performing a second function of the application in response to the touch interaction being sensed on the sub display area.

According to various embodiments of the present disclosure, a user terminal apparatus may provide various types of touch interactions by using displays disposed on front and back surfaces. Therefore, applicability and convenience of the user terminal apparatus may be increased.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 9A to 9E illustrate various types of gestures according to an embodiment of the present disclosure;

Throughout the drawings, it should be noted that like reference numbers are used to depict the same or similar elements, features, and structures.

DETAILED DESCRIPTION

Figure 1A:
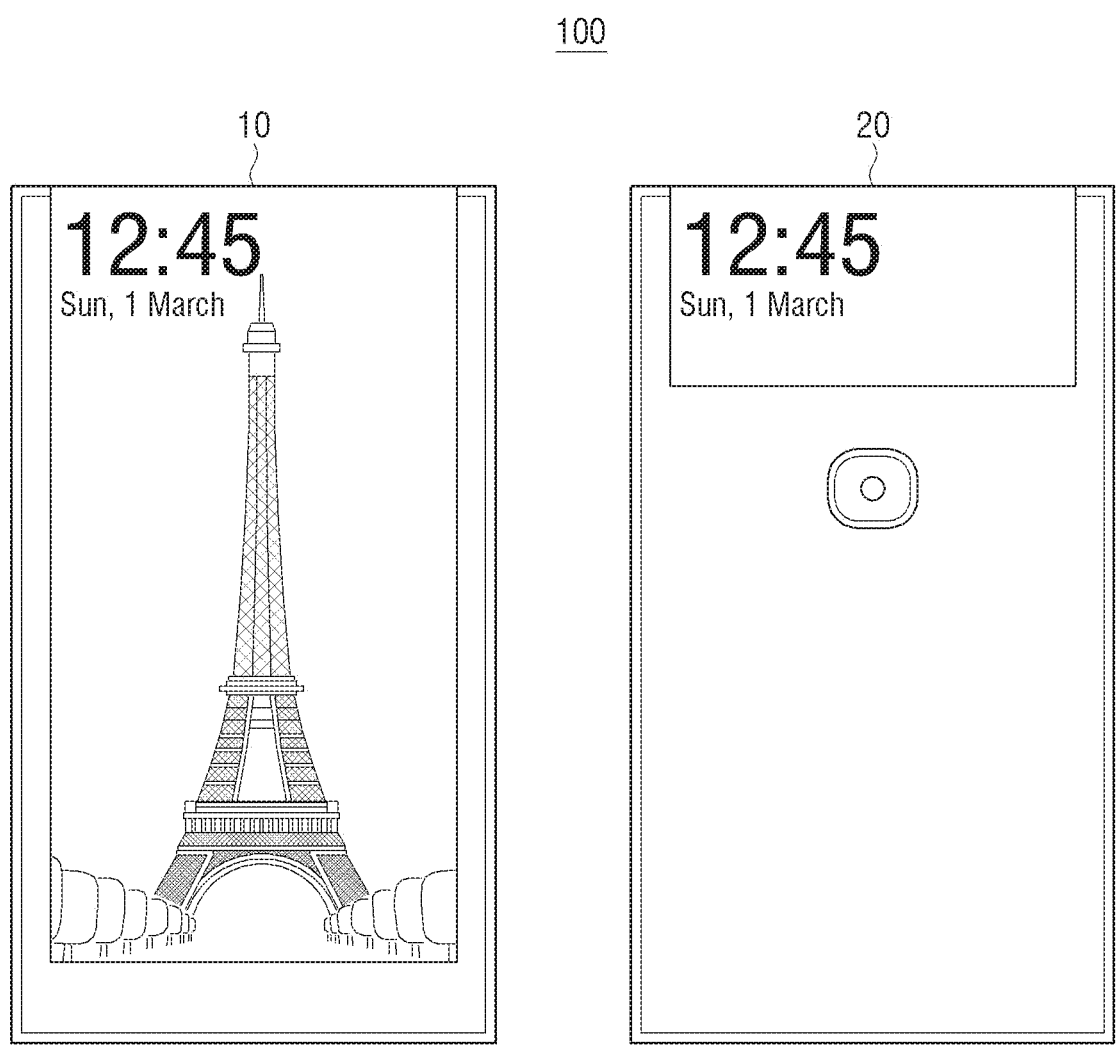
FIGS. 1A and 1B illustrate a display structure of a user terminal apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Certain embodiments of the present disclosure will now be described in greater detail with reference to the accompanying drawings.

The matters defined in the description, such as detailed construction and elements, are provided to assist in a comprehensive understanding of the disclosure. Thus, it is apparent that the embodiments of the present disclosure can be carried out without those specifically defined matters.

Hereinafter, various embodiments of the present disclosure will be described with reference to the attached drawings. It may be understood, however, that there is no intent to limit embodiments to particular forms disclosed, but on the contrary, the embodiments are to cover all modifications, equivalents, and alternatives falling within the scope of the present disclosure. Like numbers refer to like elements throughout the description of the figures.

As used herein, expressions, such as "first", "second", etc., may modify various types of elements regardless of orders and/or importance and do not restrict the corresponding elements. These expressions may be used to distinguish one element from another. For example, without departing from the scope of the present disclosure, a first element may be referred to as a second element, and similarly, the second element may also be referred to as the first element.

It will be understood that when an element (e.g., a first element) is referred to as being operatively or communicatively coupled and/or connected to another element, the element may be connected to the another element directly or indirectly through another element (e.g., a third element). In contrast, when an element (e.g., a first element) is referred to as being "directly coupled and/or connected to", there are no intervening element (e.g., a third element) between the element and another element.

Unless otherwise defined, all terms (including technical and scientific terms) used herein have the same meaning as commonly understood by one of ordinary skill in the art to which various embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The terminology defined herein may not be interpreted as excluding various embodiments of the present disclosure.

Hereinafter, various embodiments of the present disclosure will be described in detail with reference to the attached drawings.

Figure 1B:
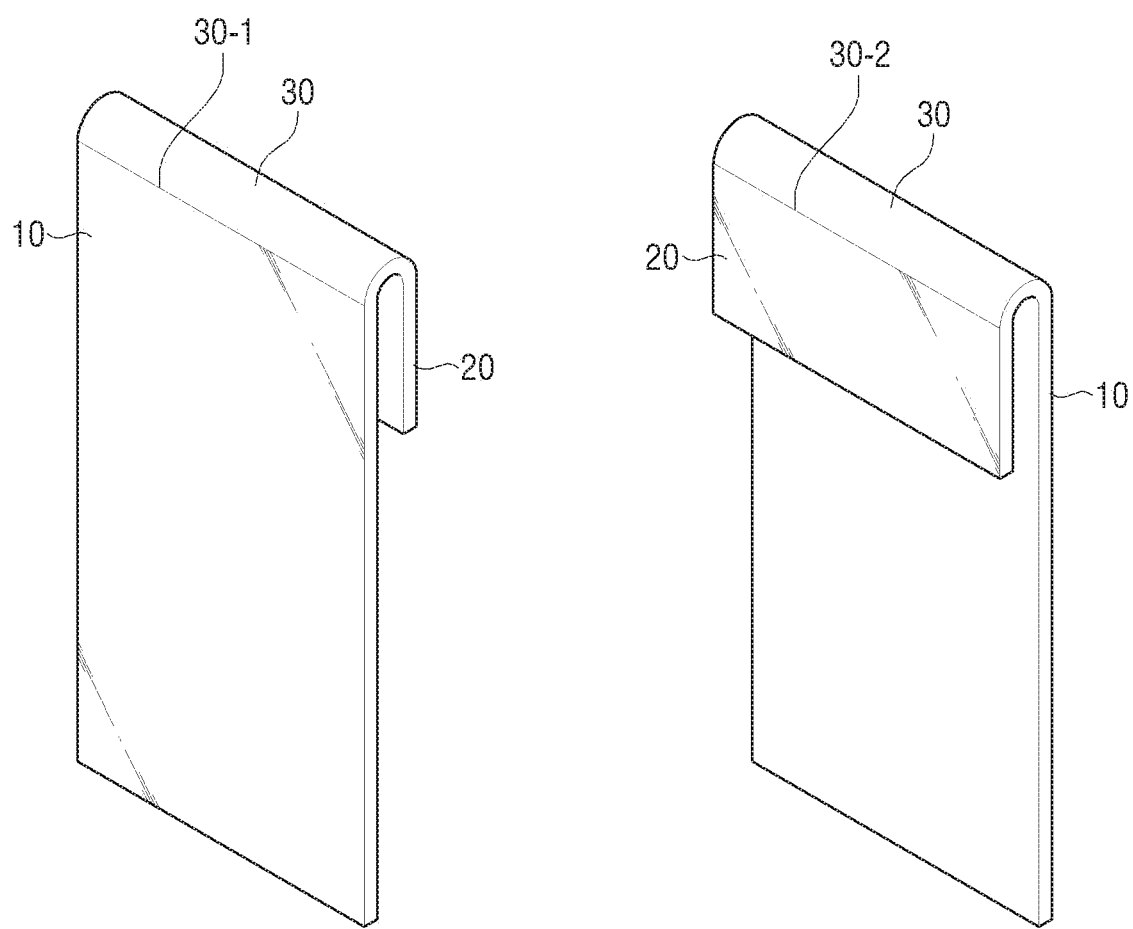

FIGS. 1A and 1B illustrate a display structure of a user terminal apparatus 100, according to an embodiment of the present disclosure.

Referring to FIG. 1A, a left drawing illustrates a front surface of the user terminal apparatus 10, and a right drawing illustrates a back surface of the user terminal apparatus 10. A front display is disposed on the front surface of the user terminal apparatus 100, and a back display is disposed on the back surface of the user terminal apparatus 100. The front and back displays may be connected to each other, and the back display may be smaller than the front display. However, the present disclosure is not limited thereto, and the front and back displays may have the same sizes. Hereinafter, the front display will be described as a main display area 10, and the back display will be described as a sub display area 20.

A left drawing of FIG. 1B is a front view of a whole display where the main display area 10, the sub display area 20, and a round display area 30 are connected to one another. A right drawing of FIG. 1B is a rear view of the whole display.

The sub display area 20 may extend from a side of the main display area 10 to be disposed in at least one area of the back surface of the user terminal apparatus 100. In particular, the sub display area 20 may extend from an upper part of the main display area 10 to be bent. A bent area may have a curved shape but is not limited thereto. Therefore, the bent area may be angulated according to a type of a display.

The round display area 30 is an area that connects the main display area 10 and the sub display area 20. As described above, the round display area 30 may have a curved shape or an angulated shape. The round display area 30 may be distinguished from the main display area 10 and the sub display area 20 by boundary lines 30-1 and 30-2.

The boundary lines 30-1 and 30-2 of FIG. 1B are merely an embodiment and thus may be changed. The boundary lines 30-1 and 30-2 may also be changed by a manufacturer when being manufactured or by a user. If the boundary lines 30-1 and 30-2 are changed, sizes of the main display area 10, the sub display area 20, and the round display area 30 may be changed, and sizes of contents respectively displayed on the main display area 10, the sub display area 20, and the round display area 30 may be changed.

An upper part of the user terminal apparatus 10 is covered as illustrated in FIGS. 1A and 1B, but one of a lower part, a left side, and a right side of the user terminal apparatus 100 may be covered. Also, not one side but a plurality of sides may be covered.

A display may cover a touch pad, and the display and the touch pad may form a layer structure so as to be realized as a touch screen. In this case, the touch pad may be bent similarly to the display, and thus a touch input may be executed on the contrary to what a user thinks. For example, if the user drags the main display area 10 from a point of the main display area 10 to an upper point and drags the sub display area 20 from a point of the sub display area 20 to an upper point, the user may determine that touched areas of the user terminal apparatus 100 are different from each other, but the touched areas of the user terminal apparatus 100 may be touched in the same orientation. However, since the touch pad is bent, the dragging of the main display area 10 from the point of the main display area 10 to the upper point and the dragging of the sub display area 20 from the point of the sub display area 20 to the upper point are input in opposite orientations. Therefore, the user terminal apparatus 100 may be set to recognize an orientation of a touch input of one area as an opposite orientation. Detailed contents of this depart from the scope of the present disclosure and thus are omitted.

Since the main display area 10, the sub display area 20, and the round display area 30 are connected to one another, various types of sensors and receivers may be included on sides or a lower part of the user terminal apparatus 10. In particular, a directional receiver may be included. Alternatively, a receiver may be included in an all-in-one cover that may be connected to the user terminal apparatus 100. If a receiver is included at the lower part of the user terminal apparatus 100, a processor 120 may reverse and display upper and lower parts of the main display area 10 when making a phone call.

Hereinafter, a structure of the sub display area 20 that extends from the main display area 10 through the round display area 30 having a curved shape will be described. Also, an embodiment will be additionally extended and described for a display having another structure.

An orientation from the main display area 10 and the sub display area 20 toward the round display area 30 will be described as an upper part of the user terminal apparatus 100, and an opposite part to the upper part will be described as a lower part of the user terminal apparatus 100. Left and right sides will be described based on a display area that the user looks at. Therefore, left and right sides of the user terminal apparatus 100 when the user looks at the main display area 10 will be described on the contrary to when the user looks at the sub display area 20.

Figure 2A:
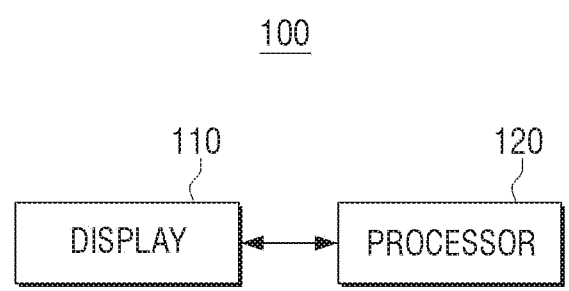
FIG. 2A is a block diagram of a configuration of a user terminal apparatus according to an embodiment of the present disclosure.

FIG. 2A is a block diagram of a configuration of the user terminal apparatus 100 according to an embodiment of the present disclosure.

Referring to FIG. 2A, the user terminal apparatus 100 includes a display 110 and the processor 120.

The display 110 may include the main display area 10 that is disposed on the front surface of the user terminal apparatus 100, the sub display area 20 that extends from a side of the main display area 10 to be disposed in at least one area of the back surface of the user terminal apparatus 10, and the round display area 30 that connects the main display area 10 and the sub display area 20. However, the display 110 is not limited thereto, for example, the sub display area 20 may be configured to cover a whole part of the back surface of the user terminal apparatus 100.

The front and back surfaces are words used for convenience of description and will not be particularly limited to meanings of the words. For example, the front and back surfaces may be a side and another side in a particular electronic apparatus. The sub display area 20 has been described as extending from the side of the main display area 10 but is not limited thereto. For example, the sub display area 20 may extend from all sides of the main display area 10 so as to enable the display 110 to cover a whole part of the user terminal apparatus 100.

The sub display area 20 of the display 110 may extend from an upper part of the main display area 10 to be bent so as to be disposed in an upper area of the back surface. For example, if the main display area 10 and the sub display area 20 are seen from a side, a connection part like a letter "U" may form a curve. However, the main display area 10 and the sub display area 20 are not limited thereto, and thus if the main display area 10 and the sub display area 20 are seen from the side, the connection part may form an angle of 90° like a character "⌐". Also, various types of connection parts may be formed based on a shape of the user terminal apparatus 100.

The display 110 may display various types of user interfaces (UIs) under control of the processor 120. For example, the display 110 may display an UI indicating a home screen, a call function, a message function, an Internet function, a content play function, or the like.

The display 110 may respectively display different contents in the main display area 110, the sub display area 20, and the round display area 30 under control of the processor 120. For example, the display 110 may display a moving image in the main display area 10, an image in the sub display area 20, and a UI for a message transmission in the round display area 30.

Alternatively, the display 110 may connectively operate at least two of the main display area 10, the sub display area 20, and the round display area 30 to display a content. For example, the display 110 may display a moving image in the main display area 10 and a UI for controlling a moving image in the sub display area 20. The display 110 may also display a UI for providing a function unrelated to the moving image in the round display area 30.

Alternatively, the display 110 may display the same content in at least two of the main display area 10, the sub display area 20, and the round display area 30. For example, the display 110 may display the same content in the main display area 10 and the sub display area 20 and a separate content in the round display area 30. The display 110 may be realized as a liquid crystal display (LCD) panel, an organic light-emitting diode (OLED) display, a plasma display panel (PDP), or the like but is not limited thereto. The display 110 may also be realized as a transparent display, a flexible display, or the like.

The processor 120 may control an overall operation of the user terminal apparatus 100.

If touch interactions are sensed on the main display area 10 and the sub display area 20 while an application is executed, the processor 120 may perform a function corresponding to the touch interactions among functions provided from the application.

In particular, the processor 120 may perform a first function of the application if the touch interaction is sensed on the main display area 10 and perform a second function of the application if the touch interaction is sensed on the sub display area 20. For example, if the main display area 10 is touched when a moving image application is executed to play a moving image in the main display area 10, the processor 120 may display a menu provided from the moving image application and end playing of the moving image if the sub display area 20 is touched. Alternatively, the processor 120 may perform functions corresponding to first and second interactions among functions provided from the application, based on both of the first interaction with the main display area 10 and the second interaction with the sub display area 20.

In particular, if the first interaction with the main display area 10 and the second interaction with the sub display area 20 are sensed, the processor 120 may perform a third function of the application. If a second interaction with the main display area 10 and a first interaction with the sub display area 20 are sensed, the processor 120 may perform a fourth function of the application.

In other words, the processor 120 may change a provided function in consideration of an area into which an interaction is input.

Here, a touch interaction may include a swipe interaction of dragging at least one of the main display area 10 and the sub display area 20 from a first point to a second point, and the processor 120 may perform a function corresponding to an orientation of the swipe interaction.

Also, a first touch interaction may be an input of touching one point of the main display area 10, a second touch interaction may be an input of touching one point of the sub display area 20, and the processor 120 may perform a function corresponding to at least one selected from the point at which the first touch interaction is sensed and the point at which the second touch interaction is sensed.

Also, the first touch interaction may be an input of touching one point of the sub display area 20, the second touch interaction may be a preset gesture input into the main display area 10, and the processor 120 may perform a function corresponding to a gesture type of the second touch interaction.

The first touch interaction may be an input of touching one point of the sub display area 20, the second touch interaction may be an input of touching at least two points of the main display area 10, and the processor 120 may perform a function corresponding to the number of points touched by the second touch interaction.

Also, the first touch interaction may be an input of touching one point of the main display area 10, and the second touch interaction may be an input of touching one point of the sub display area 20. If an orientation of the user terminal apparatus 100 is changed when the first and second touch interactions are input, the processor 120 may perform a function corresponding to the first and second touch interactions and the change in the orientation of the user terminal apparatus 100.

If the second touch interaction of touching the main display area 10 when the first touch interaction of touching one point of the sub display area 20 is input while a writing application is executed, the processor 120 may erase writing performed according to a touch trajectory of the second touch interaction.

If the first touch interaction of dragging the sub display area 20 from at least one first point to a second point is input while the writing application is executed, the processor 120 may perform writing by changing at least one selected from a thickness, a color, and a pen type of writing performed according to a touch trajectory of the second touch interaction.

Also, if the first touch interaction of touching the main display area 10 is input and the second touch interaction of touching the sub display area 20 with a preset gesture is input while the writing application is executed, the processor 120 may perform corresponding function by recognizing writing performed according to a touch trajectory of the first touch interaction.

Hereinafter, an application will be widely construed and is not restricted to an application performing a particular function such as a camera application, a music application or the like. For example, even if a home screen is displayed, the application will be described as being executed. The home screen refers to a screen on which an icon, a widget, etc. are displayed.

Figure 2B:
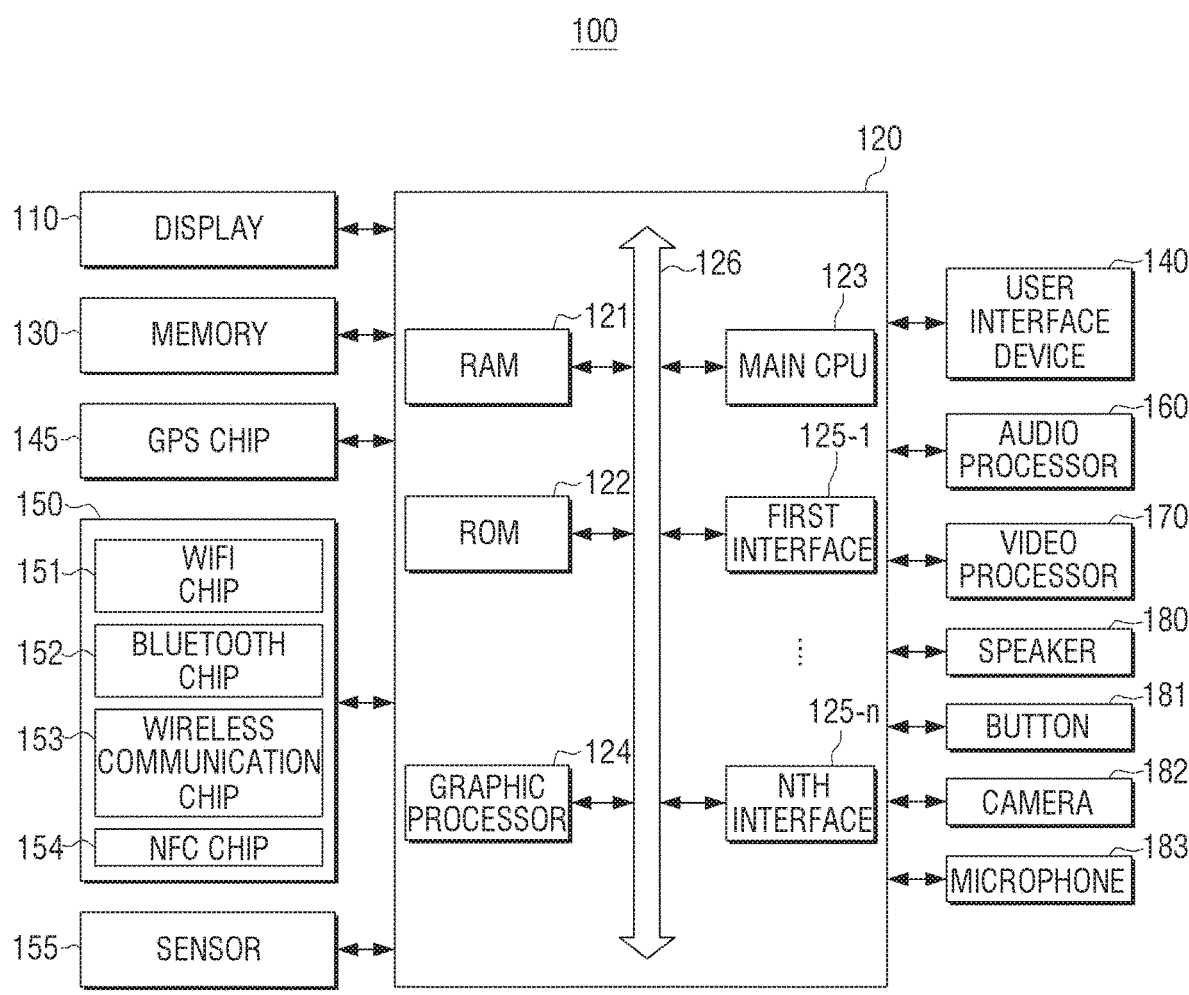
FIG. 2B is a block diagram of a detailed configuration of a user terminal apparatus according to an embodiment of the present disclosure.

FIG. 2B is block diagram of a detailed configuration of the user terminal apparatus 100 according to an embodiment of the present disclosure.

Referring to FIG. 2B, the user terminal apparatus 100 includes a display 110, a processor 120, a memory 130, a UI device 140, a global positioning system (GPS) chip 145, a communicator 150, a sensor 155, an audio processor 160, a video processor 170, a speaker 180, a button 181, a camera 182, and a microphone 183. Detailed descriptions of elements of FIG. 2B overlapping with elements of FIG. 2A are omitted.

The display 110 may be divided into the main display area 10, the sub display area 20, and the round display area 30 as described above. The display 110 may be realized as various types of displays such as an LCD, an OLED display, a PDP, etc. The display 110 may include a driver circuit, a backlight, etc. that may be realized as an amorphous silicon (a-si) thin film transistor (TFT), a low temperature polysilicon (LTPS) TFT, an organic TFT (OTFT), or the like. The display 110 may be combined with a touch sensor included in the sensor 155 to be realized as a touch screen.

Here, the sensor 155 may include at least one or more selected from a touch panel and a pen recognition panel. The touch panel may sense a finger gesture input of a user and output a touch event value corresponding to a sensed touch signal. The touch panel may be mounted under at least one selected from the main display area 10, the sub display area 20, and the round display area 30 of the display 110.

A method of the touch panel sensing the finger gesture input of the user may be classified into a capacitive method and a resistive method. The capacitive method refers to a method of sensing micro-electricity caused by a body of the user to calculate touch coordinates. The resistive method refers to a method of sensing a current flowing due to a contact between upper and lower electrode plates of the touch panel at a touched point to calculate touch coordinates.

The pen recognition panel may sense a pen gesture input of the user according to an operation of a touch pen (e.g., a stylus pen, a digitizer pen, or the like) of the user and output a pen proximity event value or a pen touch event value. The pen recognition panel may be mounted under at least one selected from the main display area 10, the sub display area 20, and the round display area 30 of the display 110.

The pen recognition panel may be realized as an electromagnetic resonance (EMR) type and sense a touch or proximity input according to changes in an intensity of an electromagnetic field caused by a proximity or a touch of the pen. In detail, the pen recognition panel may include an electromagnetic induction coil sensor (not shown) that has a grid structure and an electronic signal processor (not shown) that sequentially provides respective loop coils of the electromagnetic induction coil sensor with an alternating current (AC) signal having a preset frequency. If a pen including a resonant circuit exists around a loop coil of the pen recognition panel, a magnetic field transmitted from the corresponding loop coil generates a current in the resonant circuit of the pen based on an interactive electromagnetic induction. Based on this current, an induction field may be generated from a coil constituting the resonant circuit of the pen, and the pen recognition panel may detect the induction field from a loop coil being in a signal reception status to sense a proximity location or a touch location of the pen.

The pen recognition panel may be differently configured according to display areas. For example, the main display area 10 may include both of the touch panel and the pen recognition panel, and the sub display area 20 and the round display area 30 may include merely the touch panel.

The processor 120 may interrupt power of a particular panel to inactivate the particular panel. Alternatively, the processor 120 may supply power to the touch panel and the pen recognition panel to receive a touch or pen input or may neglect an input into the particular panel to inactivate the particular channel.

In this case, at least one selected from a hand touch and a pen touch may be input according to whether the touch panel and the pen recognition panel corresponding to the main display area 10 are activated. For example, merely the touch panel may be activated to receive the hand touch input without receiving the pen touch input or merely the pen recognition panel may be activated to receive the pen touch input without receiving the hand touch input.

Alternatively, the touch panel and the pen recognition panel may be included in a whole display area, and the pen recognition panel of a partial area may be inactivated. For example, the processor 120 may inactivate merely the pen recognition panel corresponding to the sub display area 20 and the round display area 30.

The touch panel and the pen recognition panel may be realized as one panel. In this case, the processor 120 may sense a touch input and a pen input through a whole display area.

If the touch panel and the pen recognition panel are realized as one panel, the processor 120 may perform an operation corresponding to an input based on at least one selected from an input type and an input area. For example, the processor 120 may neglect a particular input such as the pen input in terms of software. Alternatively, the processor 120 may neglect a pen input into the sub display area 20 in terms of software.

The processor 120 controls an overall operation of the user terminal apparatus 100 by using various types of programs stored in the memory 130.

In detail, the processor 120 includes a random access memory (RAM) 121, a read only memory (ROM) 122, a main central processing unit (CPU) 123, a graphic processor 124, first through $n^{th}$ interfaces 125-1 through 125-$n$, and a bus 126.

The RAM 121, the ROM 122, the main CPU 123, the graphic processor 124, and the first through $n^{th}$ interfaces 125-1 through 125-$n$ may be connected to one another through the bus 126.

The first through $n^{th}$ interfaces 125-1 through 125-$n$ are connected to various types of elements described above. One of the first through $n^{th}$ interfaces 125-1 through 125-$n$ may be a network interface connected to an external apparatus through a network.

The main CPU 123 performs booting by using an operating system (O/S) stored in the memory 130 by accessing the memory 130. Also, the main CPU 123 performs various types of operations by using various types of programs, etc. stored in the memory 130.

The ROM 122 stores a command set, etc. for booting a system. If power is supplied by inputting a turn-on command, the main CPU 123 copies the O/S stored in the memory 130 into the RAM 121 and executes the O/S to boot the system according to a command stored in the ROM 122. If the system is completely booted, the main CPU 123 performs various types of operations by copying various types of application programs stored in the memory 130 into the RAM 121 and executing the application programs copied into the RAM 121.

The graphic processor 124 generates a screen including various types of objects, such as an icon, an image, a text, etc., by using an operator (not shown) and a renderer (not shown). The operator calculates attribute values, such as coordinate values at which the objects will be respectively displayed, sizes, colors, etc. of the objects, according to a layout of the screen based on a received control command. The renderer generates a screen having various types of layouts including objects based on the calculated attribute values. The screen generated by the renderer is displayed in a display area of the display 110.

An operation of the processor 120 may be performed by a program stored in the memory 130.

The memory 130 stores various types of data such as an O/S software module for driving the user terminal apparatus 10, a touch recognition module, an application module, etc.

In this case, the processor 120 may process and display an input image based on information stored in the memory 130.

The UI device 140 receives various types of user interactions. If the user terminal apparatus 100 is realized as a touch-based portable terminal, the UI device 140 may be realized as a touch screen type forming a layer structure with a touch pad. In this case, the UI device 140 may be used as the display 110.

The GPS chip 145 is an element that receives a GPS signal from a GPS satellite to calculate a current location of the user terminal apparatus 100. If a navigation program is used or a current location of the user is needed, the processor 120 may calculate a user location by using the GPS chip 145.

The communicator 150 is an element that communicates with various types of external apparatuses according to various types of communication methods. The communicator 150 includes a WiFi chip 151, a Bluetooth chip 152, a wireless communication chip 153, a near field communication (NFC) chip 154, etc. The processor 120 communicates with various types of external apparatuses by using the communicator 150.

The WiFi chip 151 and the Bluetooth chip 152 respectively perform communications according to a WiFi method and a Bluetooth method. If the WiFi chip 151 or the Bluetooth chip 152 is used, various types of connection information, such as a subsystem identification (SSID), a session key, etc., may be first transmitted and received, and then various types of information may be transmitted and received by connecting communications by using the various types of connection information. The wireless communication chip 153 refers to a chip that performs communications according to various types of communication standards such as The Institute of Electrical and Electronics Engineers (IEEE), ZigBee, $3^{rd}$ generation (3G), 3G partnership project (3GPP), long term evolution (LTE), etc. The NFC chip 154 refers to a chip that operates according to an NFC method using a band of 13.56 MHz among various types of radio frequency identification (RFID) frequency bands such as 135 kHz, 13.56 MHz, 433 MHz, from 860 MHz to 960 MHz, 2.45 GHz, etc.

The communicator 150 may perform a unidirectional or bidirectional communication with an electronic apparatus. If the communicator 150 performs the unidirectional communication, the communicator 150 may receive a signal from the electronic apparatus. If the communicator 150 performs the bidirectional communication, the communicator 150 may receive a signal from the electronic apparatus and transmit a signal to the electronic apparatus.

The sensor 155 includes a touch sensor, a geomagnetic sensor, a gyro sensor, an acceleration sensor, a proximity sensor, a grip sensor, etc. The sensor 155 may sense various types of manipulations such as a rotation, a slope, a pressure, an approach, a grip, etc. besides the above-described touch.

The touch sensor may be realized as a capacitive type or a resistive type. The capacitive type touch sensor refers to a sensor that calculates touch coordinates by sensing microelectricity exited into a body of the user when a part of the body of the users touches a display surface by using a dielectric coated on the display surface. The resistive type touch sensor refers to a touch sensor that calculates touch coordinates by sensing a current flowing due to a contact between two electrode plates of the user terminal apparatus 100 touched by the user. Besides these, an infrared sensing method, a surface ultrasonic propagation method, an integral tension measurement method, a piezo effect method, etc. may be used to sense a touch interaction.

Also, the user terminal apparatus 100 may determine whether a touch object, such as a finger or a stylus pen, contacts or approaches the user terminal apparatus 10, by using a magnetic sensor, a magnetic field sensor, a light sensor, a proximity sensor, or the like instead of the touch sensor.

The geomagnetic sensor is a sensor for sensing a rotation status and a moving orientation of the user terminal apparatus 100, etc. The gyro sensor is a sensor for sensing a rotation angle of the user terminal apparatus 100. Both of the geomagnetic sensor and the gyro sensor may be included. However, although one of the geomagnetic sensor and the gyro sensor is included, the user terminal apparatus 100 may sense a rotation status.

The acceleration sensor is a sensor for sensing a slanted degree of the user terminal apparatus 100.

The proximity sensor is a sensor for sensing an approaching motion without directly contacting a display surface. The proximity sensor may be realize as various types of sensors such as a radio frequency oscillator type that forms a radio frequency magnetic field to induce a current through a magnetic field characteristic varying when an object approaches, a magnetic type that uses a magnet, a capacitive type that senses a capacity varying due to a proximity of an object, etc.

The grip sensor is a sensor that is disposed at a back surface, an edge, a grip part, or the like separately from the touch sensor included on a touch screen to sense a grip of the user. The grip sensor may be realized as a pressure sensor besides the touch sensor.

The audio processor 160 is an element that processes audio data. The audio processor 160 may perform various types of processing, such as decoding, amplifying, noise filtering, etc., with respect to the audio data.

The video processor 170 is an element that processes video data. The video processor 170 may perform various types of image processing, such as decoding, scaling, noise filtering, frame rate converting, resolution converting, etc., with respect to the video data.

The speaker 180 is an element that outputs various types of audio data processed by the audio processor 160, various types of notification sounds or voice messages, etc.

The button 181 may be various types of buttons such as a mechanical button, a touch pad, a wheel, etc. formed in an arbitrary area of a front part, a side, a back part, or the like of an external appearance of a main body of the user terminal apparatus 100.

The camera 182 is an element that captures a still image or a moving image under control of the user. The camera 182 may be realized as a plurality of cameras including a front camera, a back camera, etc.

The microphone 183 is an element that receives a user voice or other sounds and converts the user voice or the other sounds into audio data.

Also, although not shown in FIG. 2B, the user terminal apparatus 100 may further include various types of external input ports connected to various types of external terminals such as a universal serial bus (USB) port to which a USB connector may be connected, a headset, a mouse, a local area network (LAN), etc., a digital multimedia broadcasting (DMB) chip that receives and processes a DMB signal, various types of sensors, etc. according to various embodiments.

Figure 2C:
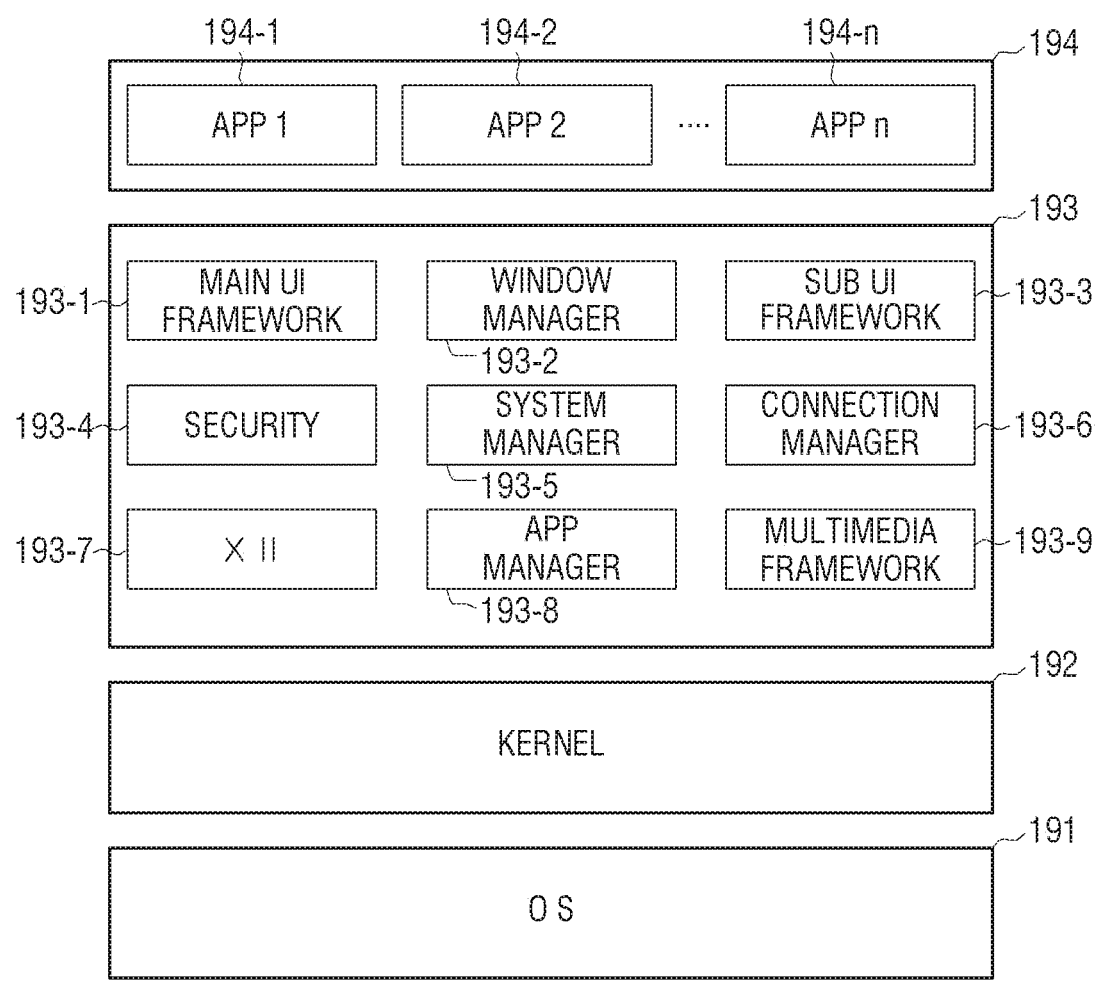
FIG. 2C is a block diagram of various types of modules stored in a memory according to an embodiment of the present disclosure.

FIG. 2C is a block diagram illustrating various types of modules stored in the memory 130 according to an embodiment of the present disclosure.

Software of FIG. 2C may be stored in the memory 130 but is not limited thereto. Therefore, the software of FIG. 2C may be stored in various types of memory devices used in the user terminal apparatus 100.

Referring to FIG. 2C, the user terminal apparatus 100 may store software including an O/S 191, a kernel 192, middleware 193, an application 194, etc.

The O/S 191 performs a function of controlling and managing an overall operation of hardware. In other words, the O/S 191 is a layer that takes charge of a basic function such as a hardware management, a memory, a security, or the like.

The kernel 192 acts as a path through which various types of signals including a touch signal sensed on the display 110, etc. are transmitted to the middleware 193.

The middleware 193 includes various types of software modules that control an operation of the user terminal apparatus 100. Referring to FIG. 2C, the middleware 193 includes a main UI framework 193-1, a window manager 193-2, a sub UI framework 193-3, a security module 193-4, a system manager 193-5, a connection manager 193-6, an X11 module 193-7, an APP manager 193-8, and a multimedia framework 193-9.

The main UI framework 193-1 is a module for providing various types of UIs that will be displayed in the main display area 10 of the display 110. The sub UI framework 193-3 is a module for providing various types of UIs that will be displayed in the sub display area 20. The main UI framework 193-1 and the sub UI framework 193-3 may include an image compositor module that forms various types of objects, a coordinate compositor module that calculates coordinates at which objects will be displayed, a rendering module that renders the formed objects at the calculated coordinates, a 2-dimensional (2D)/3-dimensional (3D) UI toolkit that provides a tool for configuring a 2D or 3D UI, etc.

The window manager 193-2 may sense a touch event or other input events by using the body of the user or a pen. If this event is sensed, the window manager 193-2 may perform an operation corresponding to an event by transmitting an event signal to the main UI framework 193-1 or the sub UI framework 193-3.

In addition to this, if the user touches and drags a screen, there may be stored various types of program modules such as a writing module for drawing a line along a drag trajectory, an angle calculation module for calculating a pitch angle, a roll angle, a yaw angle, etc. based on a sensor value sensed by a sensor, etc.

The security module 193-4 is a module that supports a certification, a permission, a secure memory, etc. for hardware.

The system manager 193-5 monitors statuses of elements of the user terminal apparatus 100 and provides the monitoring results to other modules. For example, if a residual amount of a battery lacks, an error occurs, or a communication connection status is disconnected, the system manager 193-5 may output a notification message or a notification sound by providing the monitoring results to the main UI framework 193-1 or the sub UI framework 193-3.

The connection manager 193-6 is a module for supporting a wired or wireless network connection. The connection manager 193-6 may include various types of detailed modules such as a DNET module, an UPnP module, etc.

The X11 module 193-7 is a module that receives various types of event signals from various types of hardware included in the user terminal apparatus 100. Here, an event may be variously set like an event where a user manipulation is sensed, an event where a system alarm occurs, an event where a particular program is executed or ended, etc.

The APP manager 193-8 is a module that manages execution statuses of various types of applications installed in the memory 130. If an event where an application execution command is input from the X11 module 193-7 is sensed, the APP manager 193-8 calls and executes an application corresponding to the event. In other words, if an event where at least one object is selected is sensed, the APP manager 193-8 performs an operation of calling and executing an application corresponding to the object.

The multimedia framework 193-9 is a module for playing a multimedia content stored in the user terminal apparatus 100 or provided from an external source. The multimedia framework 193-9 may include a player module, a camcorder module, a sound processing module, etc. Therefore, the multimedia framework 193-9 may perform an operation of playing various types of multimedia contents, generating and playing a screen and a sound, and playing the various types of multimedia contents.

The application 194 may include application 1 194-4, application 2 194-2, and up to application n 194-n.

The software structure illustrated in FIG. 2C is merely an embodiment but is not limited thereto. Therefore, some modules of the software structure may be omitted, modified, or added. For example, the memory 130 may additionally include various types of programs such as a sensing module for analyzing signals sensed by various types of sensors, a messaging module such as a messenger program, a short message service (SMS) and multimedia message service (MMS) program, an e-mail program or the like, a call info aggregator program module, a voice over Internet protocol (VoIP) module, a web browser module, etc.

As described above, the user terminal apparatus 100 may be realized as various types of apparatuses such as a portable phone, a tablet personal computer (PC), a laptop PC, a personal digital assistant (PDA), a Moving Picture Experts Group phase 1 or phase 2 (MPEG-1 or MPEG-2) audio layer 3 (MP3) player, an electronic frame apparatus, a television (TV), a PC, a kiosk PC, etc. Therefore, the structure described with reference to FIGS. 2B and 2C may be variously modified according to types of the user terminal apparatus 100.

As described above, the user terminal apparatus 100 may be realized in various types of forms and structures.

A basic structure and various embodiments for helping understanding of the present disclosure will now be described.

Figure 3:
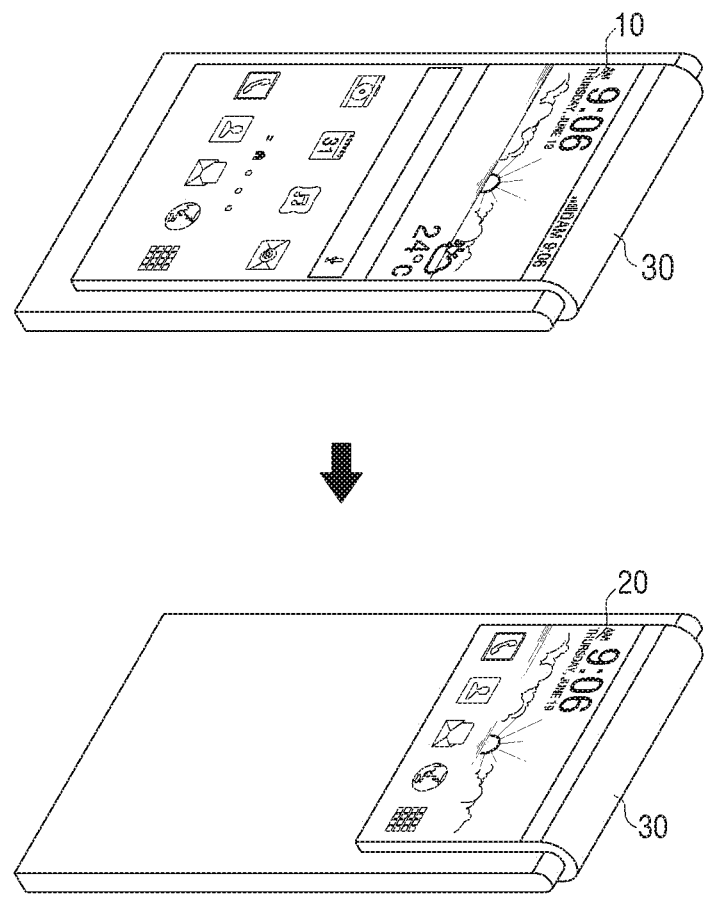
FIG. 3 illustrates using of merely one selected from a main display area, a sub display area, and a round display area according to an embodiment of the present disclosure.

FIG. 3 illustrates using of merely one of the main display area 10, the sub display area 20, and the round display area 30 according to an embodiment of the present disclosure.

Referring to FIG. 3, the processor 120 may determine an area, in which information will be provided, based on an orientation of the user terminal apparatus 100. If information is provided in one area, the processor 120 may not provide information in two different areas.

If there is a user input of pressing a power button, the processor 120 may perform an operation of determining an area in which information will be provided. Alternatively, if a phone call or a letter message is received, the processor 120 may perform an operation of determining an area in which information will be provided.

An area in which information will be provided is determined based on an orientation of the user terminal apparatus 100 as described above but is not limited thereto. For example, if there is a user input of pressing a power button, the processor 120 may provide information through an area close to eyes of the user by recognizing a user. Here, the provided information may vary according to an executed application.

The processor 120 may change a display area, in which information will be provided, through a touch input of the user on an area in which information is not provided. For example, if a user input of consecutively touching an area of the sub display area 20 is received when providing information in the main display area 10, the processor 120 may display the information, which is provided in the main display area 10, in the sub display area 20.

The processor 120 may differently display the same information according to areas that will be displayed. For example, as shown in FIG. 3, the processor 120 may change and display a layout of a home screen according to display areas.

If the orientation of the user terminal apparatus 100 is changed, the processor 120 may change an area in which information is provided. For example, if the user terminal apparatus 100 is rotated at a preset angle or more when the home screen is displayed in the main display area 10, the processor 120 may display the home screen in the sub display area 20.

In particular, if the display area is changed by changing the orientation of the user terminal apparatus 100, the processor 120 may change a layout of information that will be provided. If the area in which the information will be provided is changed, the processor 120 may change all of an object, a size of the object, contents of the object, and a layout of the object.

If the display area is changed by changing the orientation of the user terminal apparatus 100, the processor 120 may change an operation status of an application, which is being executed, and provide the changed operation status of the application into the display area. Alternatively, if the orientation of the user terminal apparatus 100 is changed, the processor 120 may divide displayed information into pieces and display the pieces of the information in display areas.

Figure 4:
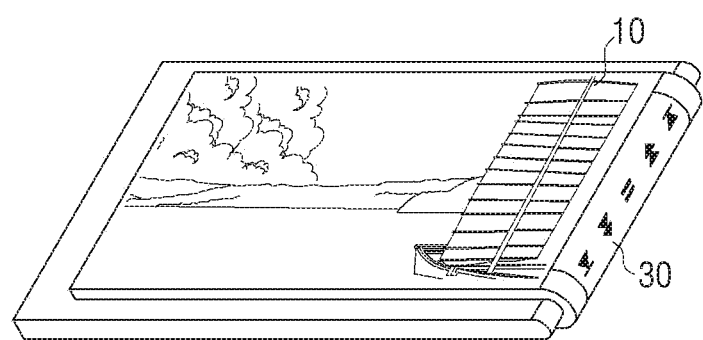
FIG. 4 illustrates using of at least two selected from a main display area, a sub display area, and a round display area according to an embodiment of the present disclosure.

FIG. 4 illustrates using of at least two of the main display area 10, the sub display area 20, and the round display area 30 according to an embodiment of the present disclosure.

Referring to FIG. 4, the processor 120 may provide related pieces of information in two of the main display area 10, the sub display area 20, and the round display area 30. For example, the processor 120 may display a moving image in the main display area 10 and display a UI for controlling the moving image in the round display area 30.

However, the processor 120 is not limited thereto and thus may provide unrelated pieces of information in two of the main display area 10, the sub display area 20, and the round display area 30.

Alternatively, if a phone call is received when a UI for controlling a moving image is displayed in the round display area 30, the processor 120 may display a phone call receiving UI in the round display area 30, move the UI for controlling the moving image into the sub display area 20, and display the UI in the sub display area 20.

If a phone call is made by touching the phone call receiving UI, the processor 120 may display a phone call UI in the round display area 30 and continuously play the moving image. Here, the processor 120 may mute the moving image. Alternatively, the processor 120 may pause the moving image.

The processor 120 may provide related pieces of information by using all of the main display area 10, the sub display area 20, and the round display area 30. For example, the processor 120 may display the moving image in the main display area 10, the UI for controlling the moving image in the sub display area 20, and an UI indicating a moving image play time in the round display area 30.

Alternatively, the processor 120 may provide unrelated pieces of information by using all of the main display area 10, the sub display area 20, and the round display area 30. Also, the processor 120 may provide related pieces of information in the two of the main display area 10, the sub display area 20, and the round display area 30 and unrelated information in the other areas.

If the orientation of the user terminal apparatus 100 is changed, the processor 120 may change display areas of pieces of information respectively displayed in areas. In particular, the processor 120 may change display areas by combining or dividing pieces of information respectively displayed in areas.

If a touch input is received on the sub display area 20, the processor 120 may display a UI, which is displayed in the sub display area 20, in the main display area 10. Alternatively, if a touch input is received on the main display area 10, the processor 120 may display a UI, which is displayed in the main display area 10, in at least one of the sub display area 20 and the round display area 30.

Although the same user touch input is sensed, the processor 120 may change a control degree of a set value according to a touch area. For example, if a drag manipulation is input into the main display area 10 or the sub display area 20 when the moving image is displayed in the main display area 10, the processor 120 may control a play time, a volume, or the like according to an orientation of the drag manipulation. Here, the processor 120 may precisely control the play time, the volume, or the like more when the drag manipulation is input into the sub display area 20 than when the drag manipulation is input into the main display area 10.

FIG. 4 illustrates an embodiment but is not limited thereto. For example, the main display area 10, the sub display area 20, and the round display area 30 may be replaced with one another. Also, an operation of FIG. 4 may be applied to another application.

Figure 5:
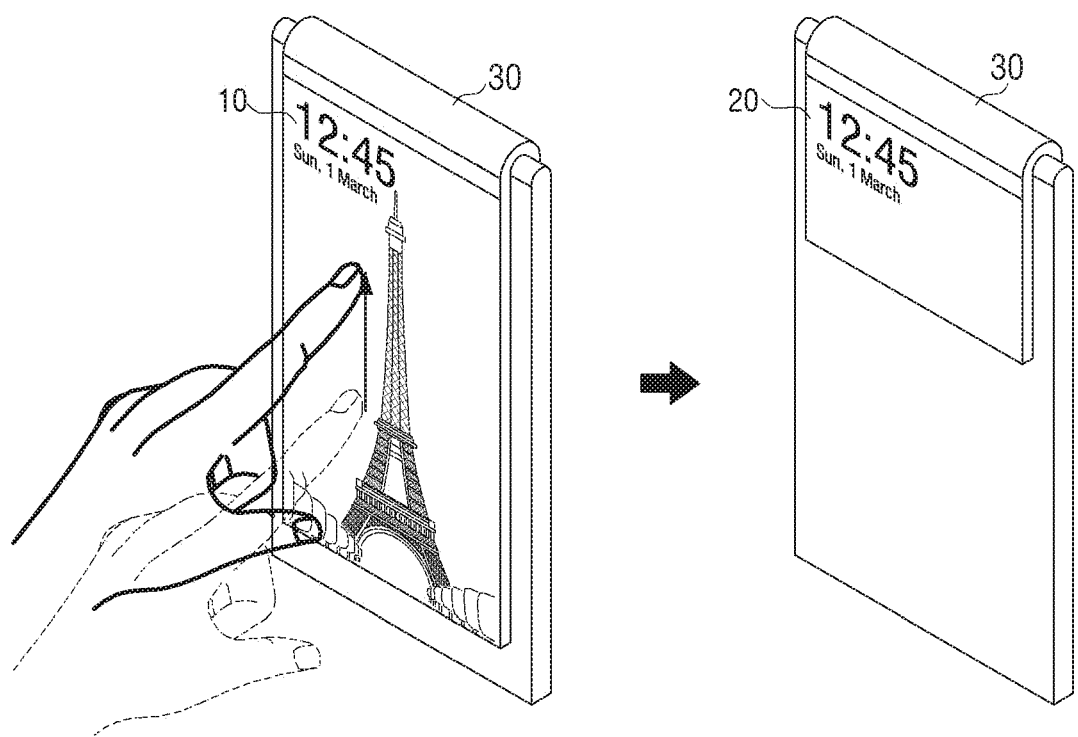
FIG. 5 illustrates operations performed according to respective areas and touch inputs according to an embodiment of the present disclosure.

FIG. 5 illustrates operations performed according respective areas and touch inputs according to an embodiment of the present disclosure.

Referring to FIG. 5, if a drag input going from an area of the main display area 10 to the round display area 30 is received, the processor 120 may display information, which is provided in the main display area 10, in the sub display area 20.

Only if a drag input higher than or equal to a preset size is received, the processor 120 may display the information, which is provided in the main display area 10, in the sub display area 20.

If information is provided in the sub display area 20 before the drag input, the processor 120 may not provide the information provided in the sub display area 20 anymore. Alternatively, the processor 120 may display the information, which is provided in the sub display area 20, in the main display area 10 or the round display area 30.

Merely the main display area 10 and the sub display area 20 are described as being used in FIG. 5 but are not limited thereto. For example, the processor 120 may display information, which is provided in one of the main display area 10 and the sub display area 20, in the round display area 30 according to types of user inputs. Alternatively, the processor 120 may display information, which is provided in the round display area 30, in one of the main display area 10 and the sub display area 20.

Although information is not provided in a particular area, the processor 120 may receive a touch input. For example, if a user input of dragging the round display area 30 when a broadcast content is displayed in the main display area 10, the processor 120 may change a channel or a volume of the broadcast content. Here, the round display area 30 may be in a status where information is not provided.

Figure 6A:
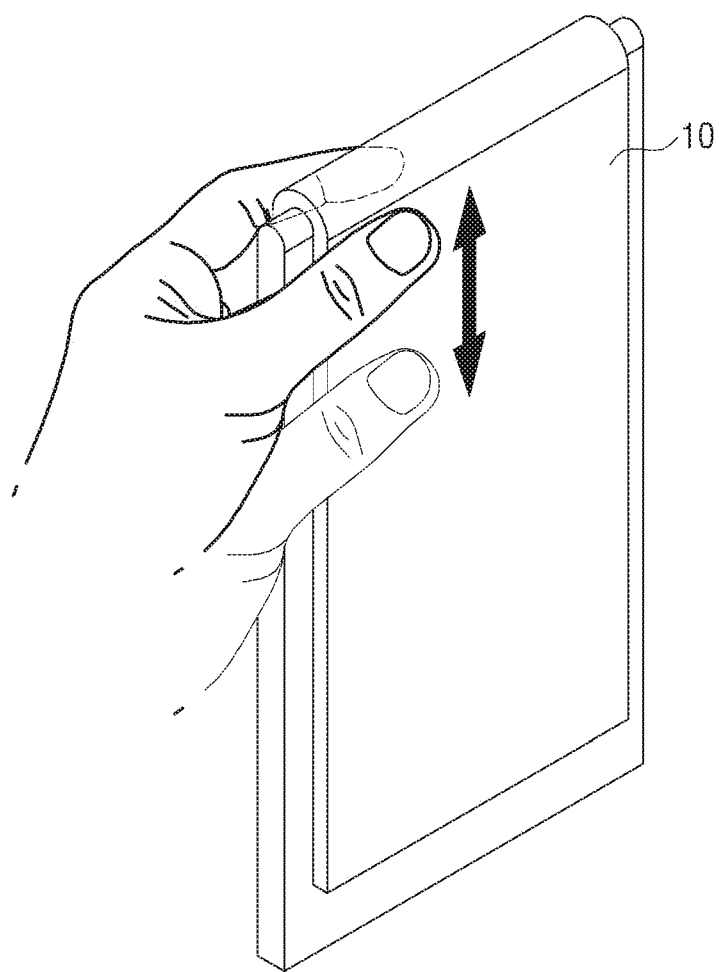
FIGS. 6A and 6B illustrate an operation of a swipe interaction of dragging a display area from a first point to a second point according to an embodiment of the present disclosure.
Figure 6B:
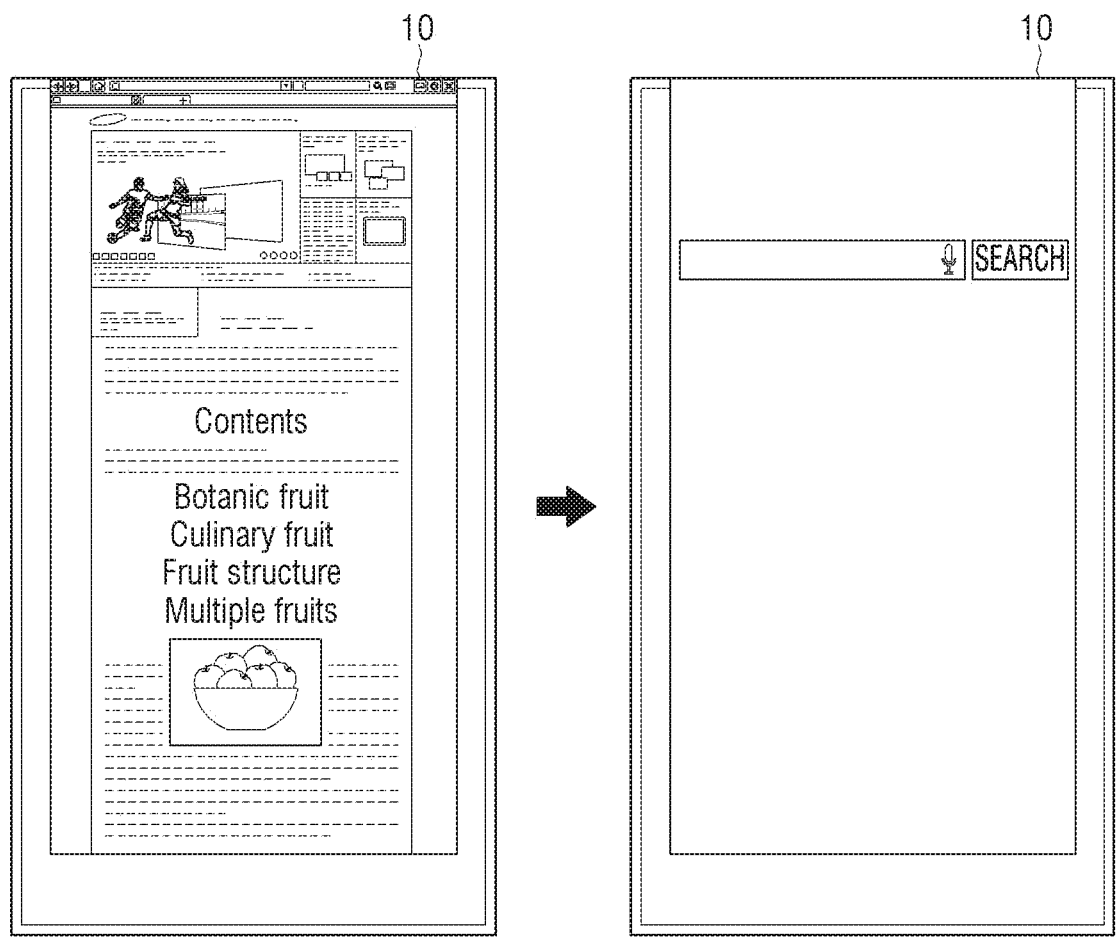

FIGS. 6A and 6B illustrate an operation of a swipe interaction of dragging a display area from a first point to a second point according to an embodiment of the present disclosure. A touch interaction may include a swipe interaction of dragging at least one of the main display area 10 and the sub display area 20 from a first point to a second point, and the processor 120 may perform a function corresponding to an orientation of the swipe interaction among functions provided from an application that is being executed.

FIG. 6A illustrates a first swipe interaction that is input into the main display area 10 and a second swipe interaction that is input into the sub display area 20. The processor 120 may perform a corresponding function according to an orientation of the first swipe interaction and an orientation of the second swipe interaction among functions provided from an application that is being executed.

If the orientation of the first swipe interaction is the same as the orientation of the second swipe interaction, the processor 120 may perform a corresponding function according to the same orientation. For example, the processor 120 may perform different functions according to cases where an orientation of a touch interaction is up, down, left, right, etc.

If the orientation of the first swipe interaction is not the same as the orientation of the second swipe interaction, the processor 120 may perform a corresponding function in consideration of both of the orientations of the first and second swipe interactions. For example, the orientation of the first swipe interaction may be up the user terminal apparatus 100, and the orientation of the second swipe interaction may be down the user terminal apparatus 100.

The processor 120 may perform different functions in consideration of touch areas and touch orientations of the touch areas. For example, the processor 120 may respectively perform different functions in cases where the orientation of the first swipe interaction is up the user terminal apparatus 100, the orientation of the second swipe interaction is down the user terminal apparatus 100, the orientation of the first swipe interaction is down the user terminal apparatus 100, and the orientation of the second swipe interaction is up the user terminal apparatus 100. However, the processor 120 is not limited thereto and thus may determine that an orientation of one swipe interaction is up, and an orientation of the other swipe interaction is down and perform a corresponding function without considering touch areas.

The processor 120 may perform a corresponding function by dividing the main display area 10 or the sub display area 20 into a plurality of areas and reflecting an initial touch point. For example, although the orientations of the first and second swipe interactions are equally up, the processor 120 may perform different functions according to whether an initial touch point of the first swipe interaction is at a center or an edge of the main display area 10.

The processor 120 may consider a size of a swipe interaction. If a swipe interaction of dragging the main display area 10 form at least one first point of the main display area 10 to a second point is input, the processor 120 may determine that the input of the swipe interaction is an available input merely if a distance between the first and second points is longer than or equal to a preset distance.

The processor 120 may reflect a size of an initial touch point. For example, the processor 120 may compare sizes of initial touch areas of the main display area 10 and the sub display area 20 and perform different functions according to the comparison results.

FIG. 6B illustrates operations performed if both of an orientation of a first swipe interaction with the main display area 10 and an orientation of a second swipe interaction with the sub display area 20 are down the user terminal apparatus 100 when an Internet application is executed.

The processor 120 may display a new Internet window in consideration of orientations of first and second swipe interactions. Alternatively, if the orientations of the first and second swipe interactions are up, the processor 120 may close an Internet window that is being seen. Also, if the orientations of the first and second swipe interactions are to the left, the processor 120 may display a previous screen of the Internet window that is being seen. If the orientations of the first and second swipe interactions are to the right, the processor 120 may display a next screen of the Internet window that is being seen. If there is no next screen, the processor 120 may not perform any operation.

Alternatively, if a home screen is displayed, and the orientations of the first and second swipe interactions are down, the processor 120 may perform a function that is frequently used. If the home screen is displayed, and the orientations of the first and second swipe interactions are up, the processor 120 may control not to provide information in the main display area 10 and the sub display area 20.

If the orientations of the first and second swipe interactions are down when getting a phone call, the processor 120 may make a phone call to an opposite person. If a contact list is displayed, and the orientations of the first and second swipe interactions are up, the processor 120 may make a phone call to an opposite person that is focused on the contact list.

If a message application is executed, and the orientations of the first and second swipe interactions are down, the processor 120 may display a UI for writing a new message. Alternatively, if the message application is executed, and the orientations of the first and second swipe interactions are up, the processor 120 may transmit the written message.

If a gallery application is executed, and the orientations of the first and second swipe interactions are down, the processor 120 may execute a camera application. If the gallery application is executed, and the orientations of the first and second swipe interactions are up, the processor 120 may delete a displayed content and transmit the displayed content to another electronic apparatus.

If a music or moving image application is executed, and the orientations of the first and second swipe interactions are down, the processor 120 may display a UI for adding new music or moving image to a list. If the music or moving image application is executed, and the orientations of the first and second swipe interactions are up, the processor 120 may delete music or moving image that is currently being played.

For convenience of description, a case where the orientations of the first and second swipe interactions are the same, in particular, a case where the orientations of the first and second swipe interactions are up and down has been limitedly described above. However, the present disclosure is not limited thereto, and thus a corresponding function may be performed even if the orientations of the first and second swipe interactions are not up and down or are not the same.

Figure 7A:
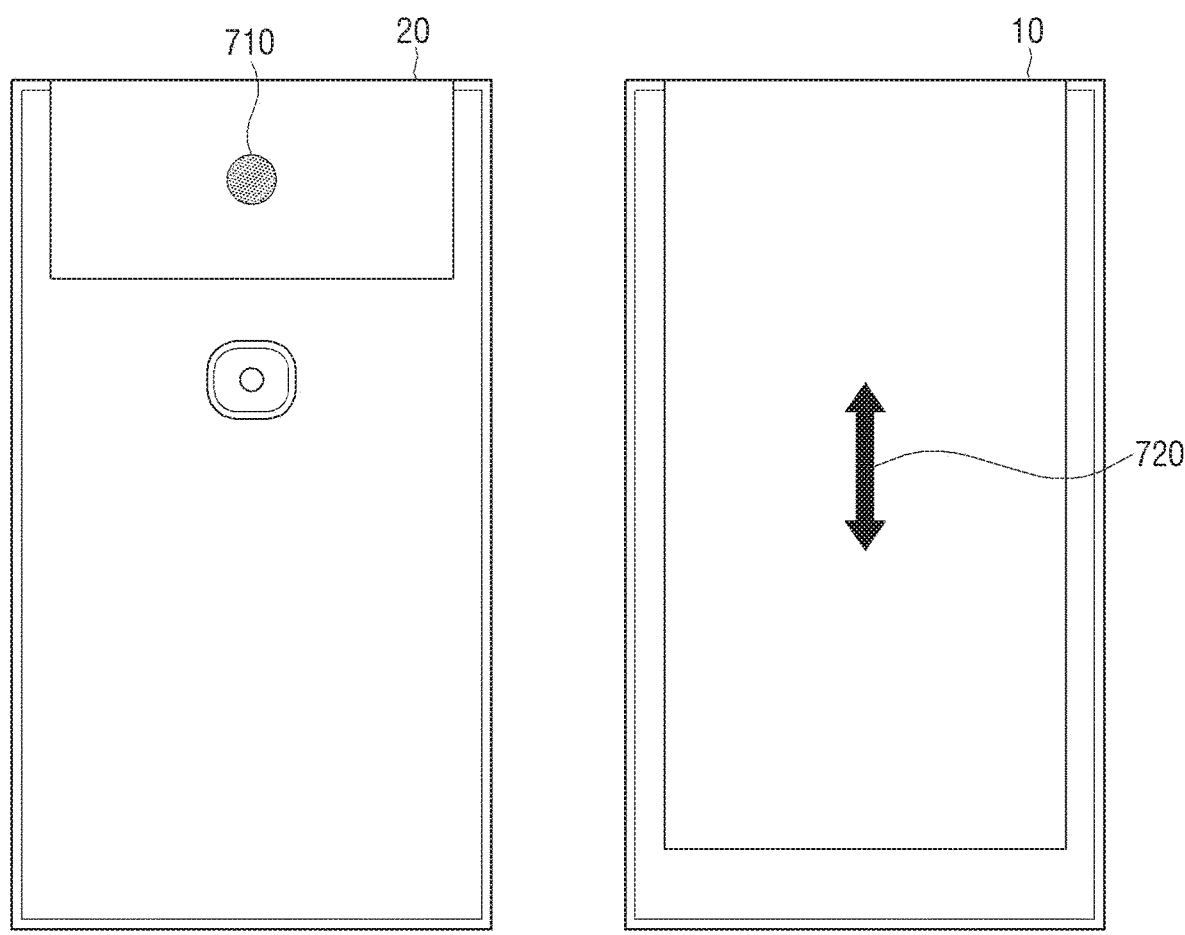
FIGS. 7A and 7B illustrate an operation of a touch interaction and an operation of a swipe interaction according to an embodiment of the present disclosure.
Figure 7B:
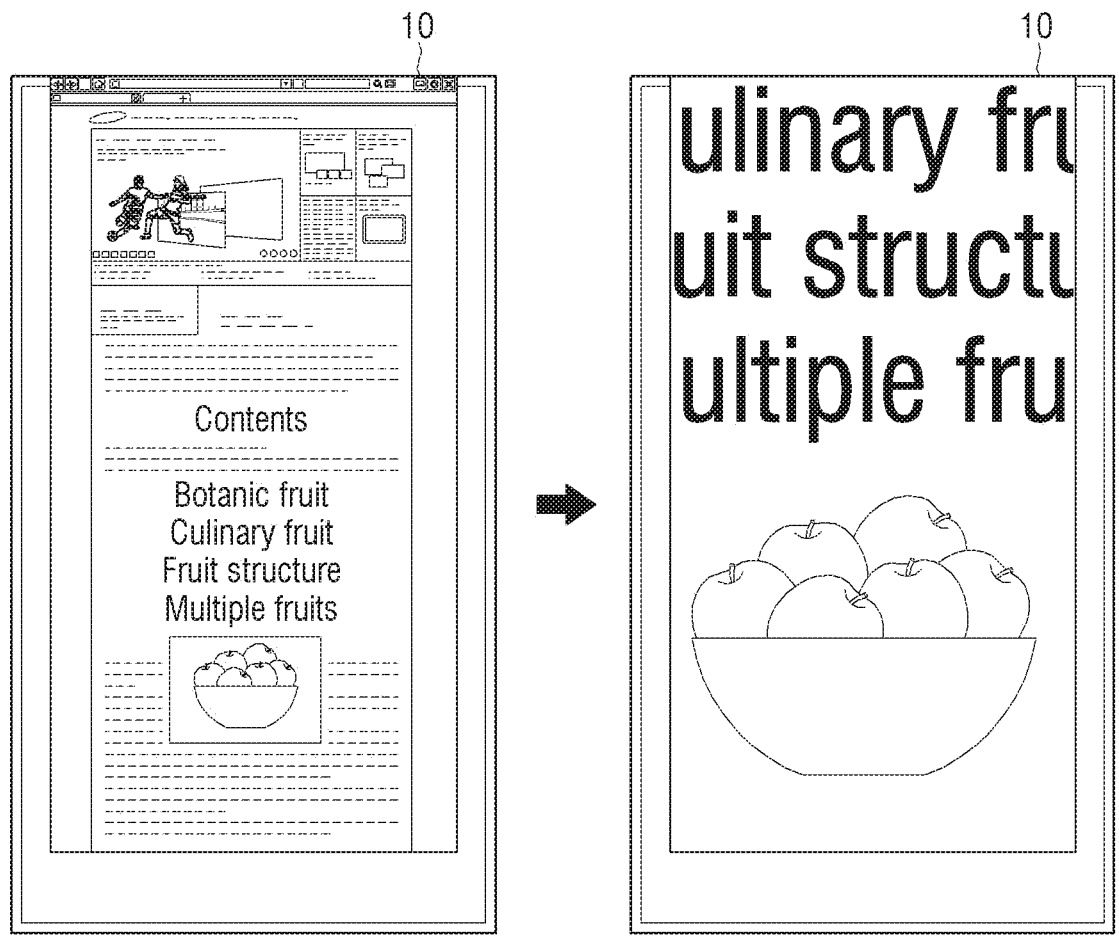

FIGS. 7A and 7B illustrate operations of a touch interaction and a swipe interaction according to an embodiment of the present disclosure.

FIG. 7A illustrates a touch interaction that is input into one point 710 of the sub display area 20 and a swipe interaction that is input into the main display area 10. The processor 120 may perform a corresponding function according to an orientation of the swipe interaction among functions provided from an application that is being executed. Merely a swipe interaction 720 toward up and down orientations is illustrated in FIG. 7A, but a swipe interaction toward other orientations may be input, and different functions may be respectively performed.

Although the same swipe interaction is input according to whether a touch interaction is input, the processor 120 may perform different functions. This will be described with reference to FIG. 7B.

The processor 120 may perform a corresponding function by dividing the main display area 10 into a plurality of areas and reflecting an initial touch point. For example, even if an orientation of the swipe interaction is up, the processor 120 may perform different functions according to whether the initial touch point of the swipe interaction is at a center or an edge of the main display area 10.

The processor 120 may consider a size of the swipe interaction. For example, if a swipe interaction of dragging the main display area 10 from at least one first point of the main display area 10 to a second point is input, the processor 120 may determine the input as an available input merely if a distance between the first and second points is longer than or equal to a preset distance.

The processor 120 may perform a corresponding function in consideration of a touch point of the sub display area 20 and an orientation of a swipe interaction. For example, although a swipe interaction toward the same orientation is input, the processor 120 respectively perform different functions according to a case where the center of the sub display area 20 is touched and a case where the edge of the sub display area 20 is touched.

The processor 120 may also perform a corresponding function in consideration of the number of touch points of the sub display area 20 and an orientation of a swipe interaction. For example, although a swipe interaction toward the same direction is input, the processor 120 may respectively perform different functions according to a case where there is one touch point on the sub display area 20 and a case where there are two points on the sub display area 20.

FIG. 7B illustrates a touch interaction that is input into one point of the sub display area 20 and a swipe interaction toward up and down orientations that is input into the main display area 10 when an Internet application is executed.

If a swipe interaction is input into the main display area 10 when a touch interaction is input into one point of the sub display area 20, the processor 120 may increase or reduce and display the Internet window. If a swipe interaction is input into the main display area 10 without inputting a touch interaction into the sub display area 20, the processor 120 may scroll the Internet window.

Alternatively, if a swipe interaction toward left and right orientations is input into the main display area 10 when a home screen is displayed, and a touch interaction is input into one point of the sub display area 20, the processor 120 may display another application that is being executed on a background. The application executed on the background refers to an application that is being executed or an application that is not displayed. The user terminal apparatus 100 may simultaneously execute a plurality of applications but may display merely some of the plurality of applications and execute the other applications due to a limit to a display size.

If the home screen is displayed, and a swipe interaction toward left and right orientations is input into the main display area 10 without inputting a touch interaction into the sub display area 20, the processor 120 may display another home screen.

Alternatively, if a swipe interaction toward up and down orientations is input into the main display area 10 when a contact list is displayed, and a touch interaction is input into one point of the sub display area 20, the processor 120 may display the contact list with sequentially skipping the contact list at preset intervals. Alternatively, the processor 120 may skip and display the contact list in alphabetic units. For example, if contact numbers starting with "B" are displayed, and a swipe interaction is input, the processor 120 may display contact numbers starting with "C". If the contact list is displayed, and a swipe interaction toward left and right orientations is input into the main display area 10 without inputting a touch interaction into the sub display area 20, the processor 120 may sequent scroll the contact list without skipping the contact list.

The processor 120 may operate with respect to a message application, a gallery application, and a music or moving image application like when contact numbers are displayed.

For convenience of description, there has been described above merely an operation performed according to whether a swipe interaction is input into the main display area 10, and a touch interaction is input into one point of the sub display area 20. However, the present disclosure is not limited thereto, and thus the processor 120 may perform a corresponding function among functions provided from an application that is being executed even in a modification of the embodiment of FIG. 7A.

A swipe interaction has been described as being input into one point with reference to FIGS. 6A, 6B, 7A, and 7B but is not limited thereto. For example, the swipe interaction may be an operation of dragging a plurality of points by using a plurality of fingers.

Figure 8A:
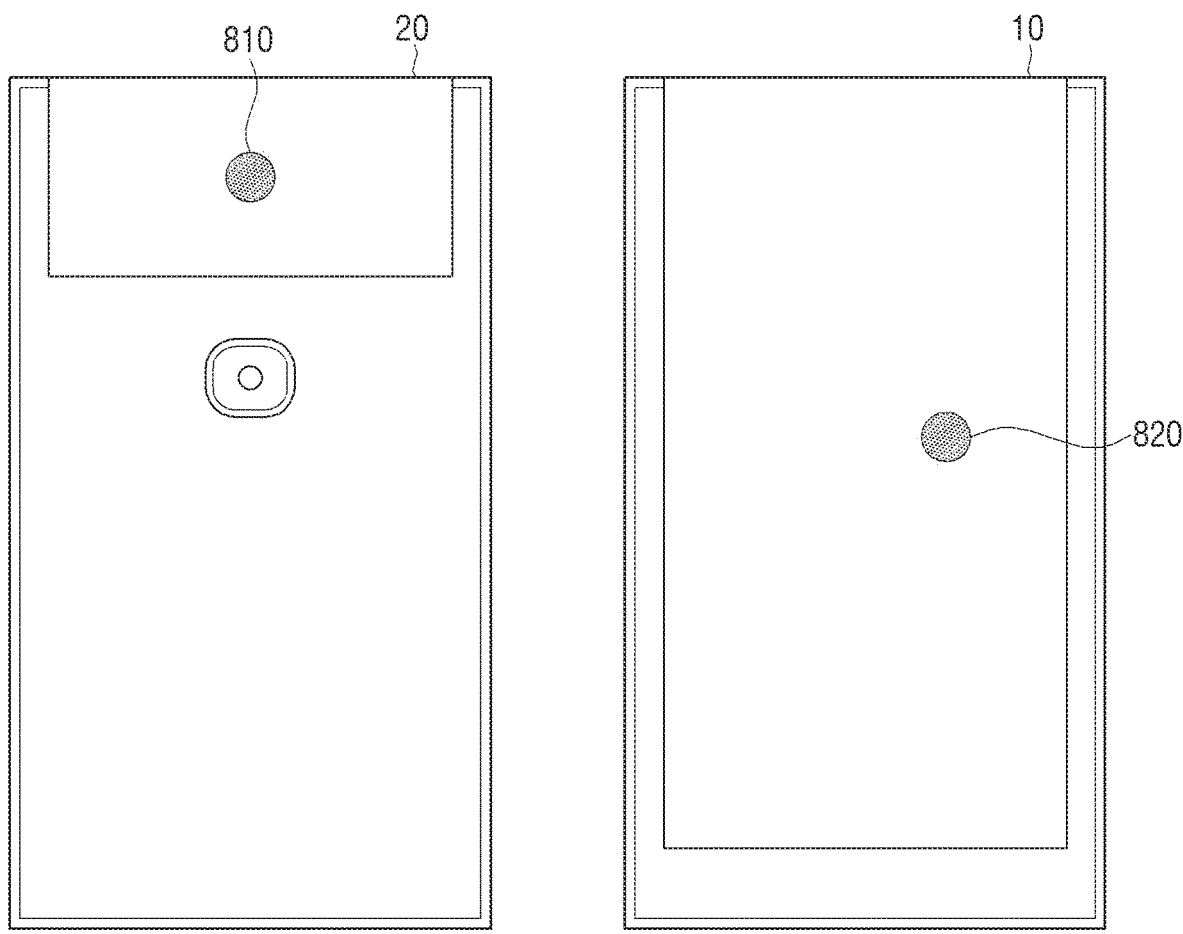
FIGS. 8A and 8B illustrate operations performed according to touch points according to an embodiment of the present disclosure.
Figure 8B:
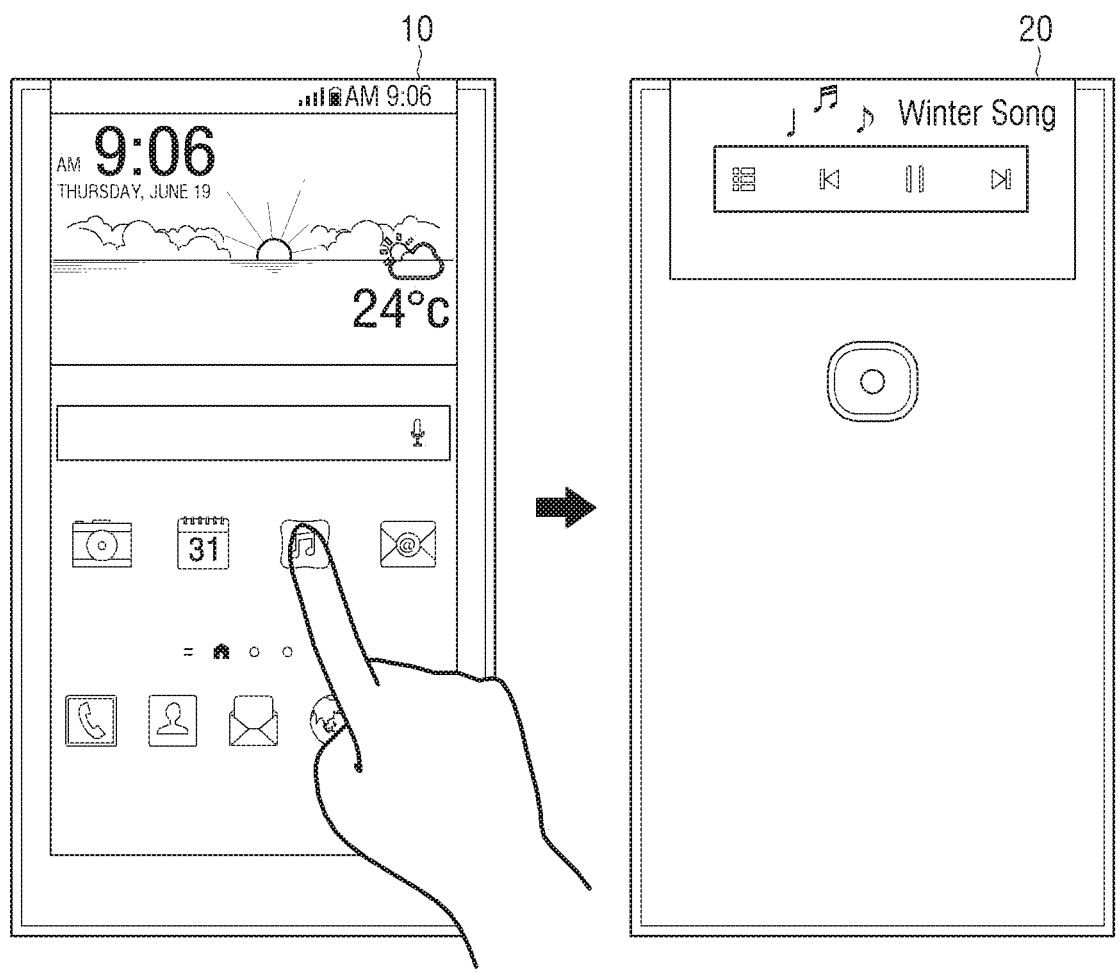

FIGS. 8A and 8B illustrate operations performed according to touch points according to an embodiment of the present disclosure.

Referring to FIG. 8A, a first touch interaction may be an input of touching one point 820 of the main display area 10, a second touch input may be an input of touching one point 810 of the sub display area 20, and the processor 120 may perform a function corresponding to at least one selected from the point 820 at which the first touch interaction is sensed and the point 810 at which the second touch interaction is sensed.

Alternatively, the processor 120 may perform a corresponding function in consideration of touch duration times and touch points of the first and second touch interactions. For example, the processor 120 may perform a corresponding function by comparing a duration time of the first touch interaction with a preset time. Also, the processor 120 may perform a corresponding function according to the number of consecutive touches of the first touch interaction. For convenience of description, merely the first touch interaction has been described, but the second touch interaction may be equally applied.

The processor 120 may perform a corresponding function in consideration of touch orders and touch points of the first and second touch interactions. For example, the processor 120 may respectively perform different functions in a case where the first touch interaction is sensed earlier than the second touch interaction and in a case where the second touch interaction is sensed earlier than the first touch interaction.

The processor 120 may consider a size of a touch area. For example, the processor 120 may determine a touch input as an available input merely if the touch area is greater than or equal to a preset size.

Referring to FIG. 8B, if a first touch interaction of touching a music icon of the main display area 10 is input when a home screen is displayed, and a second touch interaction of touching one point of the sub display area 20 is input, the processor 120 may display a music application in the sub display area 20. Alternatively, if a camera icon is touched according to a first touch interaction, the processor 120 may display a camera application in the sub display area 20. If the home screen is displayed, and a first touch interaction of touching a music icon of the main display area 10 is input without a touch interaction with the sub display area 20, the processor 120 may display a music application in the main display area 10.

The processor 120 may equally operate with respect to a message application, an Internet application, and a gallery application like when the home screen is displayed. For example, if a touch interaction of selecting a particular message, a particular link, a particular image, etc. is input when the message application, the Internet application, and the gallery applications are respectively executed, the processor 120 may respectively display contents, which will be described, in the sub display area 20 not in the main display area according to the touch interaction.

Alternatively, if a first touch interaction of touching a left side of the main display area 10 is input when a music or moving image application is executed, and a second touch interaction of touching one point of the sub display area 20, the processor 120 may change currently played music or moving image into previous music or moving image of a play list. Also, if a first touch interaction of touching a right side of the main display area 10 is input, the processor 120 may change the currently played music or moving image into next music or moving image of the play list.

For convenience of description, there has been described merely a case where a first touch interaction of touching one point of the main display area 10 is input when a second touch interaction of touching one of the sub display area 20 is input. However, the present disclosure is not limited thereto, and thus the processor 120 may perform a corresponding function among functions provided from an application that is being executed even in the modification of the embodiment described with reference to FIG. 8A.

FIGS. 9A to 9E illustrate various types of gestures according to an embodiment of the present disclosure. The processor 120 may perform a corresponding function among functions provided from an application based on at least one selected from a touch point, the number of touch points, a shape of a trajectory formed by consecutive touches, and a touch orientation.

FIG. 9A illustrates a touch interaction of dragging a screen up and down by using two fingers. The processor 120 may perform a corresponding function based on the number of touch points and a touch orientation.

FIG. 9B illustrates a touch interaction of touching the screen by using a thumb and an index finger and outstretching the thumb and the index finger. The processor 120 may perform a corresponding function based on a point initially touched by the thumb and the index finger and a distance between the thumb and the index finger.

FIG. 9C illustrates a touch interaction of touching the screen by using the thumb and the index finger and then dragging the thumb and the index finger in a clockwise direction. The processor 120 may perform a corresponding function based on a point initially touched by the thumb and the index finger, a distance between the thumb and the index finger, and a movement orientation of the index finger.

FIG. 9D illustrates a touch interaction of touching the screen by using three fingers and then dragging the three fingers in a clockwise or counterclockwise direction. The processor 120 may perform a corresponding function based on an initially touched point, the number of touch points, and movement orientations of the three fingers.

FIG. 9E illustrates a touch interaction of dragging the screen to the left and right by using three fingers. The processor 120 may perform a corresponding function based on the number of touch points and a touch orientation.

Merely some touch interactions are illustrated in FIGS. 9A to 9E for convenience of description but are not limited thereto. For example, the processor 120 may recognize a touch interaction that is performed by a palm.

Controlling the user terminal apparatus 100 through a gesture input into the main display area 10 and a touch interaction with the sub display area 20 described with reference to FIGS. 9A to 9E will now be described with reference to FIGS. 10A, 10B, 11A, and 11B.

FIGS. 10A, 10B, 11A, and 11B illustrate operations performed according to a gesture input and a touch interaction according to an embodiment of the present disclosure.

Figure 10A:
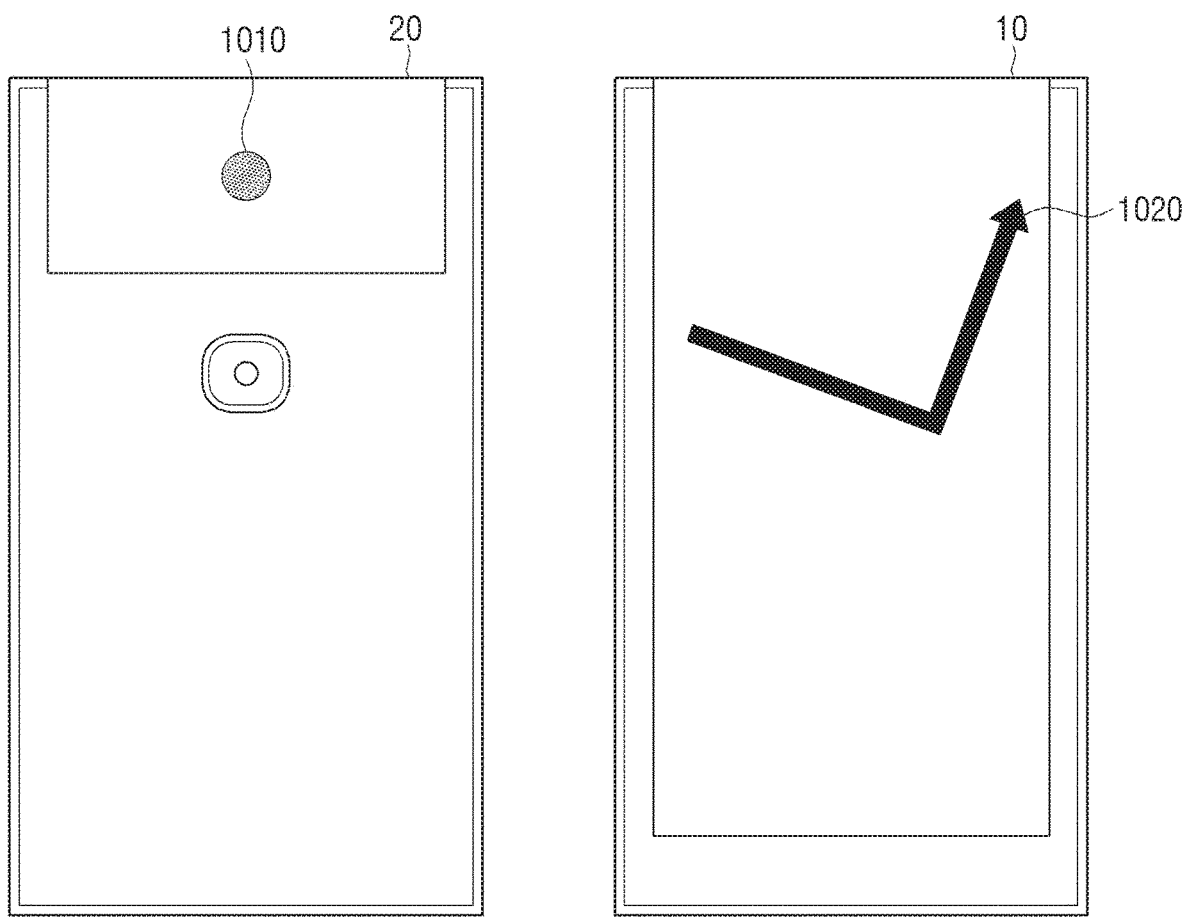
FIGS. 10A, 10B, 11A, and 11B illustrate operations performed according to a gesture input and a touch interaction according to an embodiment of the present disclosure.
Figure 10B:
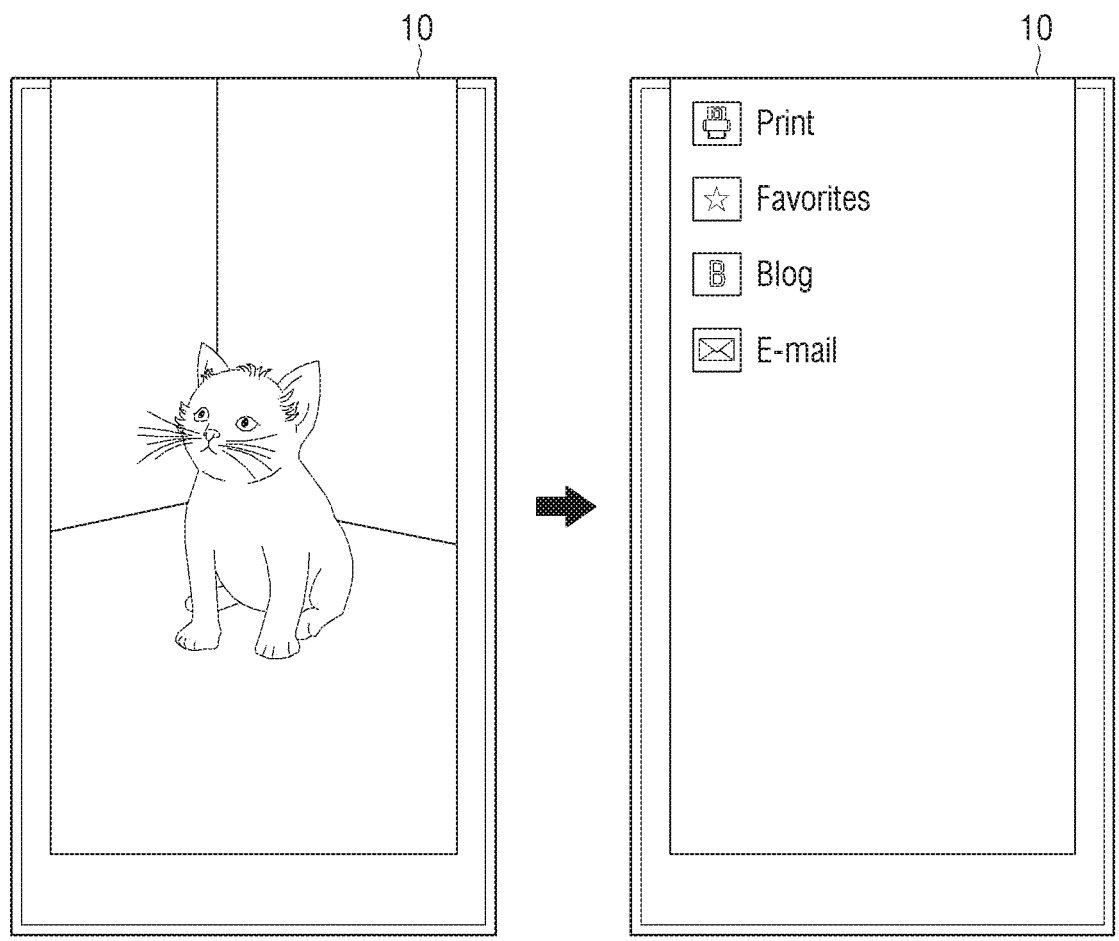

FIGS. 10A and 10B illustrate a first touch interaction of touching one point 1010 of the sub display area 20 and a second touch interaction that is a preset gesture input 1020 into the main display area 10, according to an embodiment of the present disclosure. A preset gesture input is a touch interaction of dragging a screen in a letter "v" in FIG. 10A but is not limited thereto. For example, the gesture input may be a touch interaction of dragging the screen in a letter "U" or in various shapes.

The processor 120 may perform different operations based on a start point of the gesture input. For example, although a touch interaction of dragging the screen in the letter "v" is input, the processor 120 may perform different operations according to whether the start point is a center or an edge of the main display area 10.

The processor 120 may perform different operations according to a size of the gesture input. For example, although a touch interaction of dragging the screen in the shape "v" is input, the processor 120 may perform different operations according to a case where a whole part of the main display area 10 is used and a case where a part of the edge of the main display area 10 is used.

Although there is a preset gesture input into the main display area 10 without a touch interaction with the sub display area 20, the processor 120 may not perform any operation.

FIG. 10B illustrates operations performed if a first touch interaction of touching one point of the sub display area 20 is input and a second touch interaction that is a preset gesture input into the main display area 10 is input when a gallery application is executed. Here, the preset gesture input may be a touch interaction of dragging the main display area 10 in the letter "v".

If the above-described touch interaction is input when a particular image is displayed by executing a gallery application, the processor 120 may display a menu for managing the displayed image. For example, the processor 120 may print the displayed image or may provide a function for attaching the displayed image to a blog or an e-mail.

Alternatively, if a touch interaction of dragging the main display area 10 in a letter "e" is input, the processor 120 may immediately e-mail the displayed image.

Figure 11A:
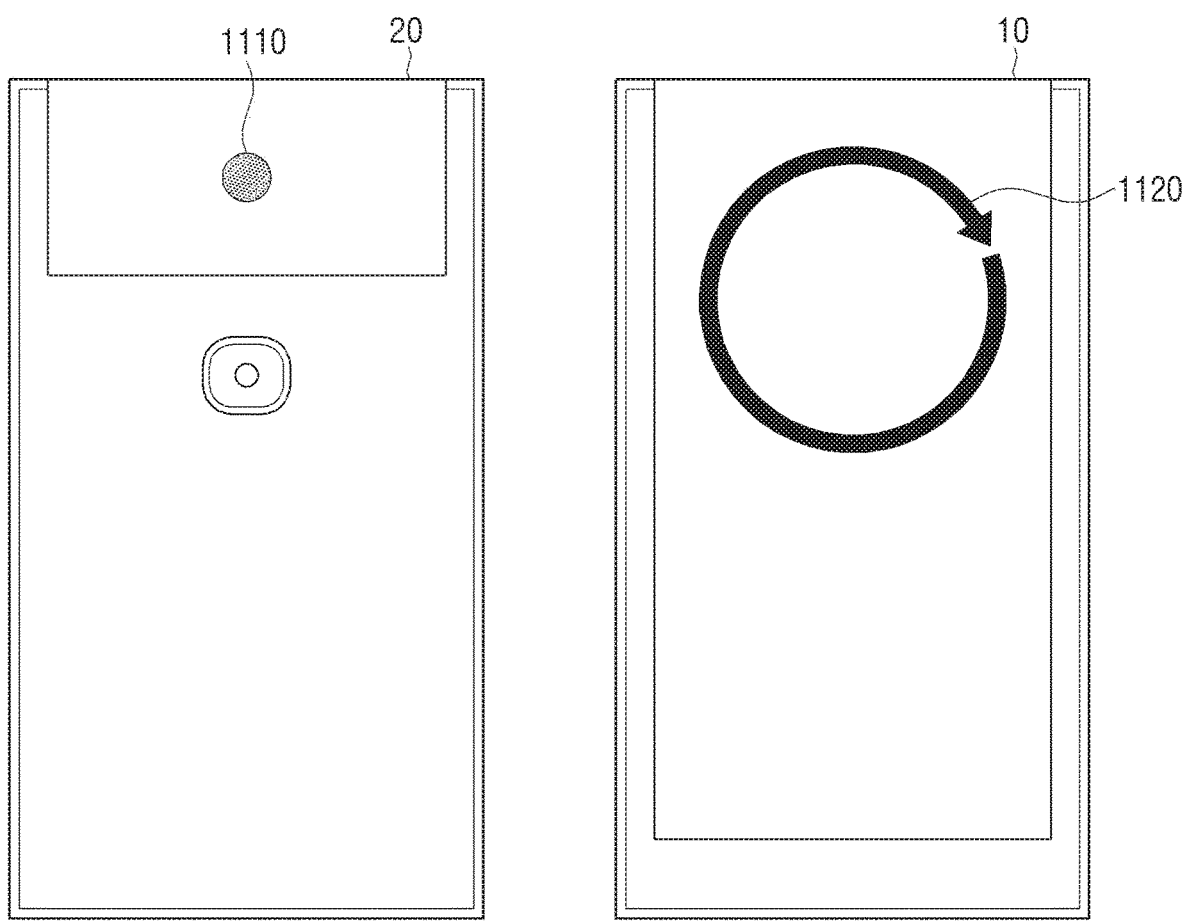
Figure 11B:
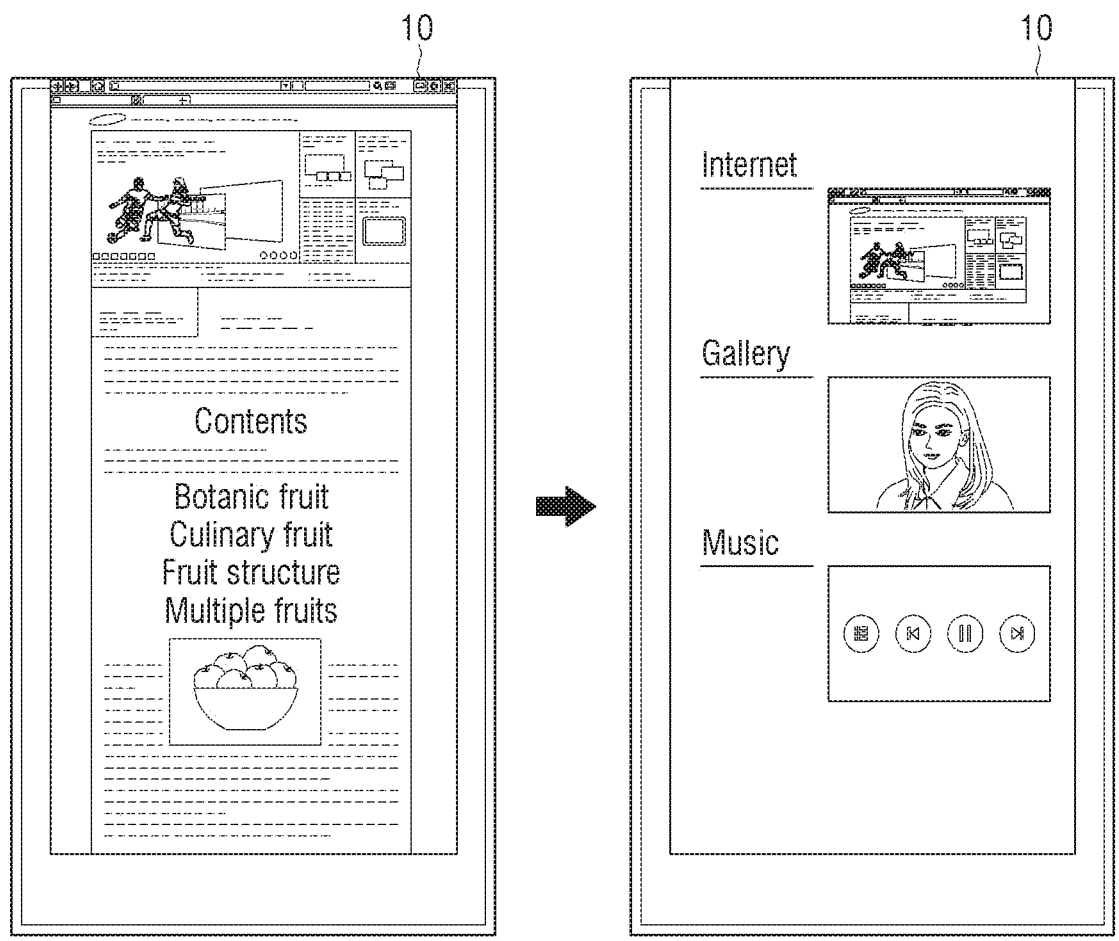

FIGS. 11A and 11B illustrate operations performed if a first touch interaction of touching one point 1110 of the sub display area 20 is input and a second touch interaction is input as a preset gesture input 1120 into the main display area 10 when an Internet application is executed according to an embodiment of the present disclosure. Here, a preset gesture input may be a touch interaction of dragging the main display area 10 in a letter "o".

Referring to FIG. 11B, if the above-described touch interaction is input when a particular webpage is displayed by executing the Internet application, the processor 120 may display a list of applications that are being executed on a background. For example, the processor 120 may display an Internet application that is being displayed in the main display area 10, and a gallery application and a music application that are being executed in the background.

Merely some gesture types have been described for convenience but are not limited thereto. Therefore, functions corresponding to other types of gestures may be performed. Also, functions corresponding to other applications not to the above-described application may be performed. For example, if a first touch interaction of touching one point of the sub display area 20 is input and a touch interaction of dragging the main display area 10 in the letter "o" is input when a music or moving image application is executed, the processor 120 may provide a function of navigating a content faster than a touch interaction of dragging the sub display area 20 to the left and right.

Figure 12A:
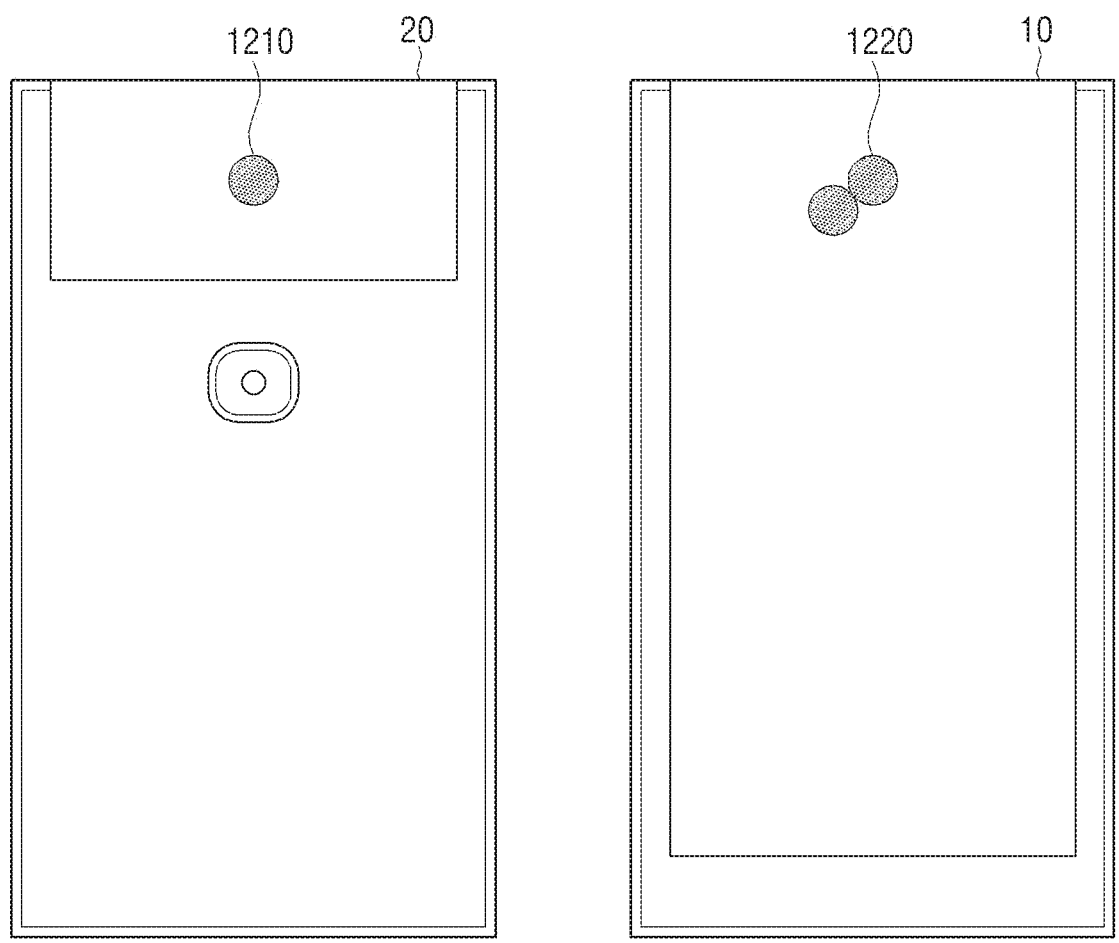
FIGS. 12A and 12B illustrate an operation performed according to the number of touch points according to an embodiment of the present disclosure.
Figure 12B:
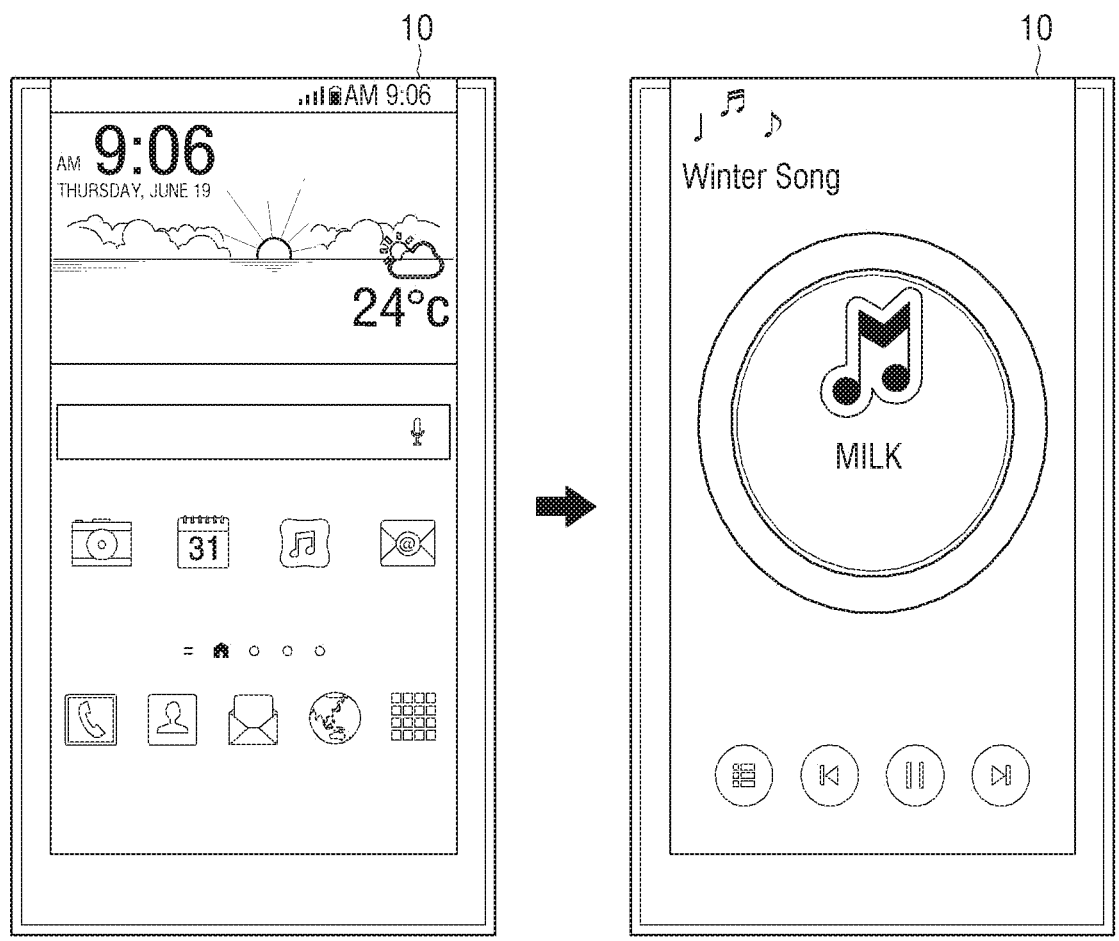

FIGS. 12A and 12B illustrate operations performed according to the number of touch points according to an embodiment of the present disclosure.

Referring to FIG. 12A, a first touch interaction may be an input of touching one point 1210 of the sub display area 20, a second touch interaction may be an input of touching at least two points 1220 of the main display area 10, and the processor 120 may perform a function corresponding to the number of points touched by the second touch interaction among functions provided from an application. Touches on the at least two points 1220 do not need to contact each other. Also, the touches on the at least two points 1220 do not need to be simultaneously performed but may be performed within a preset time.

The processor 120 may perform a corresponding function in consideration of touch points of the at least two points 1220. For example, although there is an input of touching two points, the processor 120 may perform different functions according to whether a center or an edge of the main display area 10 is touched.

The processor 120 may perform a corresponding function in consideration of a distance between at least two points. For example, although there is an input of touching two points, the processor 120 may perform a first operation if a distance between the two points is longer than or equal to a preset distance and may perform a second operation if the distance between the two points is shorter than the preset distance.

If at least three points are touched, the processor 120 may calculate an average of distances between the three touch points and compare the average with a preset distance. However, the present disclosure is not limited thereto, and the processor 120 may select one from distances between points.

FIG. 12B illustrates an operation performed if a touch interaction as described with reference to FIG. 12A is input on a home screen. The processor 120 may execute a music application if a touch interaction is input as shown in FIG. 12A. However, the processor 120 is not limited thereto and thus may execute another application or make a phone call to a particular person.

Alternatively, if a message application is executed, and a touch interaction as shown in FIG. 12A is input, the processor 120 may erase a whole written message. Alternatively, if an Internet application is executed, and a touch interaction as shown in FIG. 12A is input, the processor 120 may screen-capture and store a displayed webpage. If a music or moving image application is executed, and a touch interaction as shown in FIG. 12A is input, the processor 120 may pause the music or moving image that is being played.

Merely an operation of touching two points of the main display area 10 has been described above for convenience. However, the present disclosure is not limited thereto, and thus the processor 120 may perform a corresponding function among functions provided from an application that is being executed, according to a modification of the embodiment of FIG. 12A.

Figure 13A:
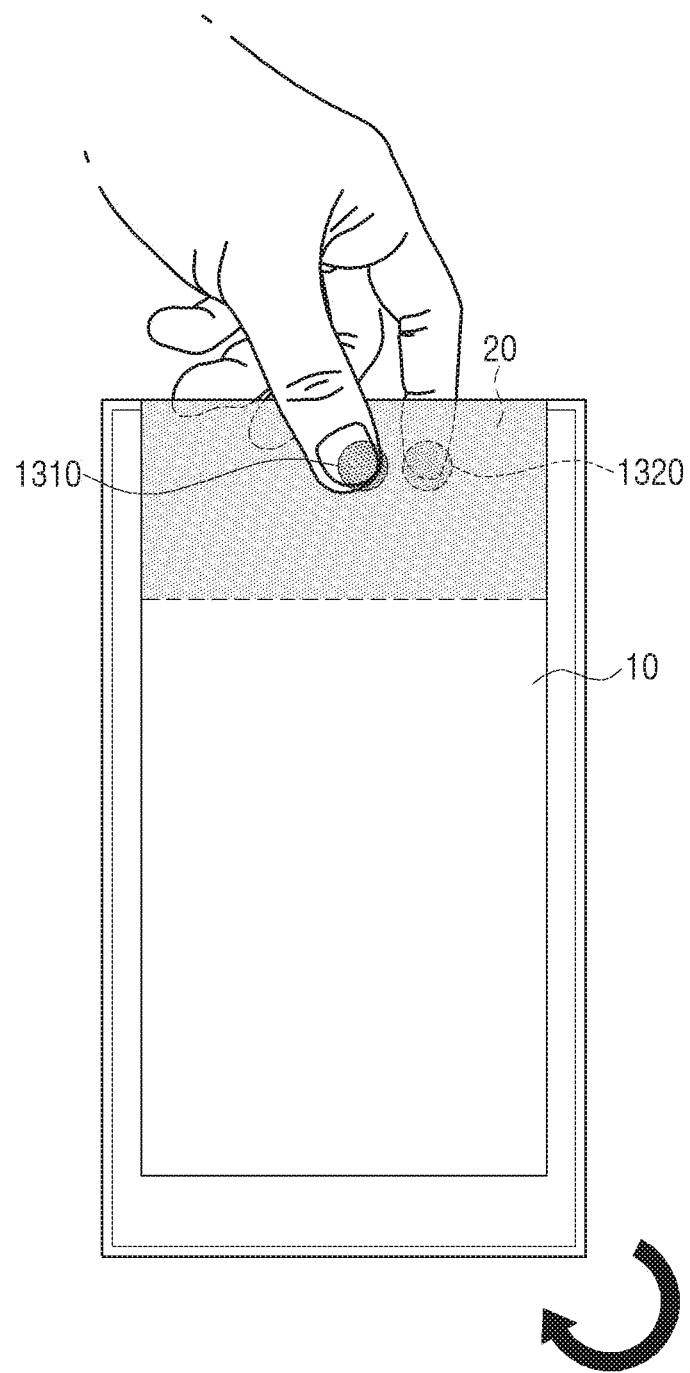
FIGS. 13A to 13C illustrate operations performed according to a touch interaction and an orientation of a user terminal apparatus according to an embodiment of the present disclosure.
Figure 13B:
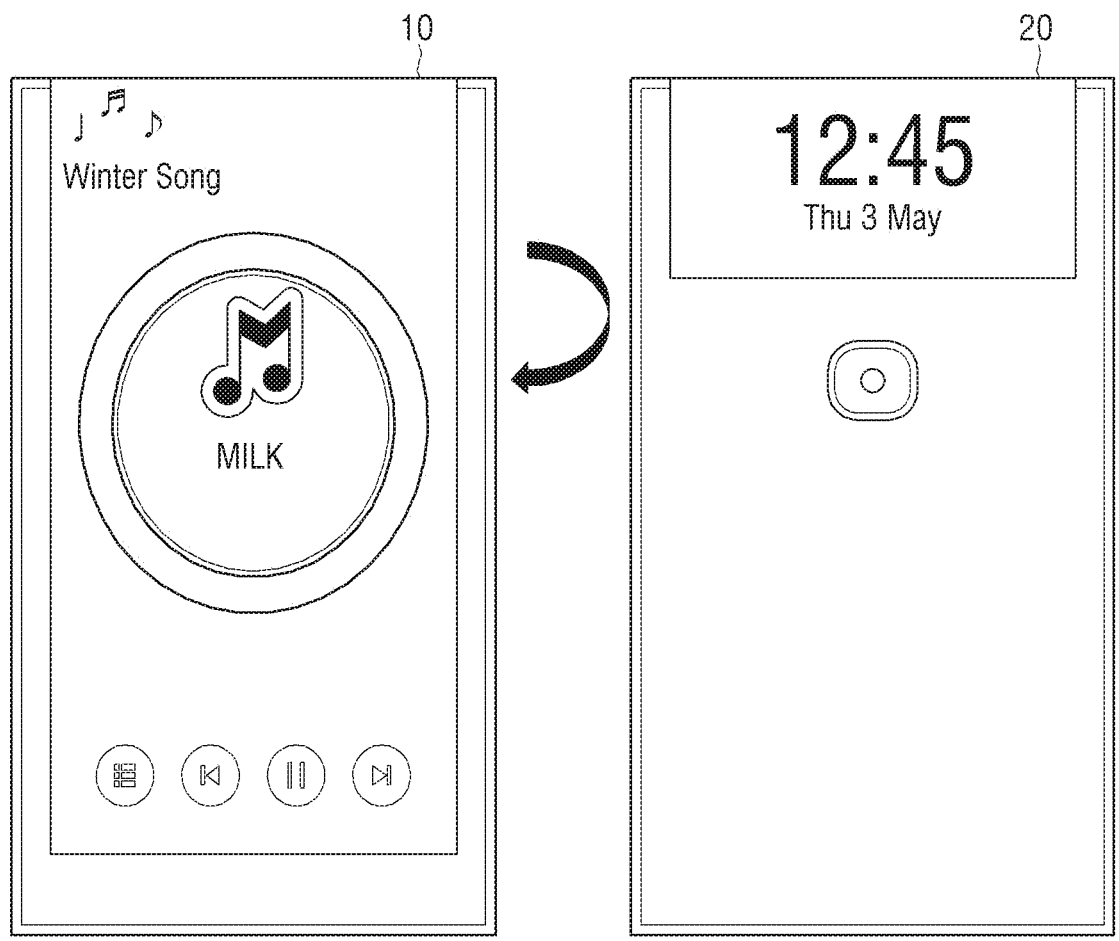
Figure 13C:
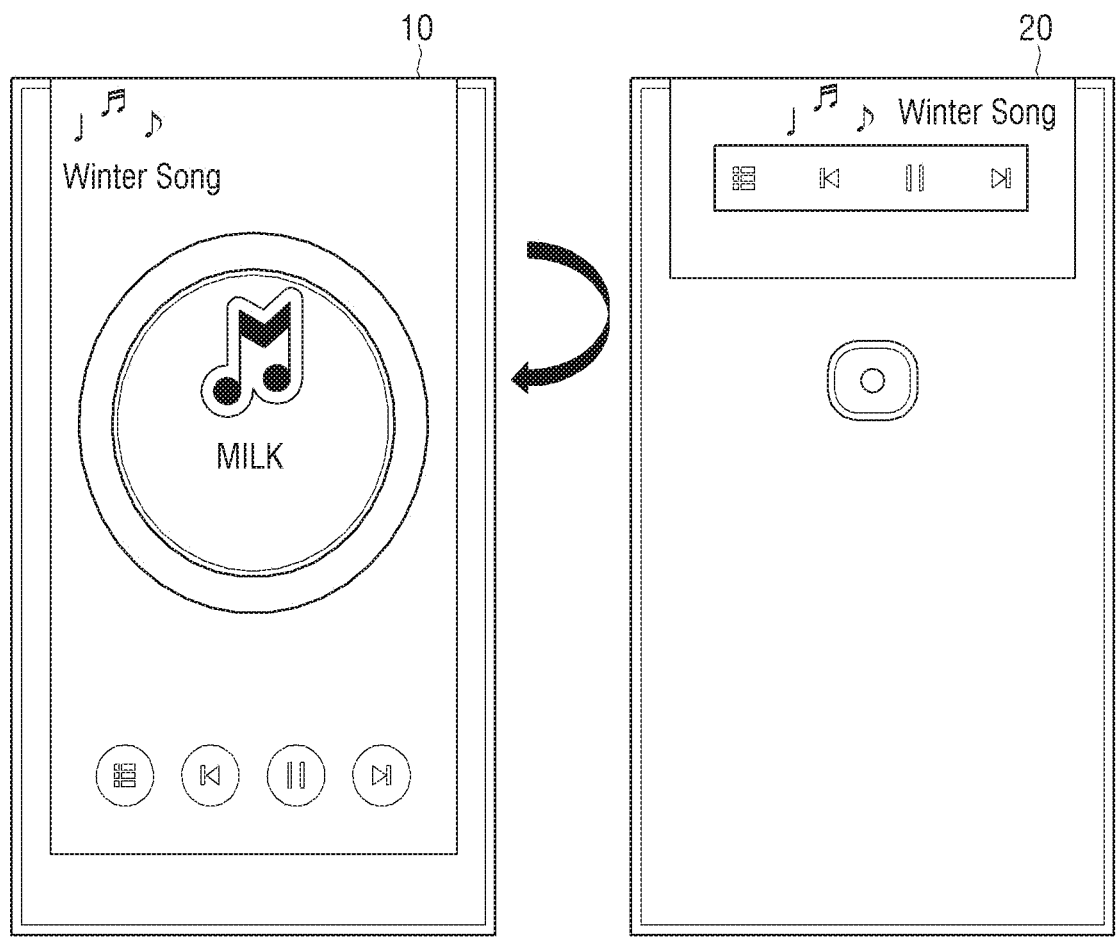

FIGS. 13A to 13C illustrate operations performed according to touch interactions and an orientation of the user terminal apparatus 100 according to an embodiment of the present disclosure.

Referring to FIG. 13A, a first touch interaction may be an input of touching one point 1310 of the main display area 10, and a second touch interaction may be an input of touching one point 1320 of the sub display area 20. If an orientation of the user terminal apparatus 10 is changed when the first and second touch interactions are input, the processor 120 may perform a function corresponding to the first and second touch interactions and the change in the orientation of the user terminal apparatus 100.

The processor 120 may determine that the orientation of the user terminal 100 is changed by using a gravity sensor, an acceleration sensor, a gyro sensor, or the like. Alternatively, the processor 120 may analyze image information acquired by the camera 182 to determine that the orientation of the user terminal apparatus 100 is changed.

FIG. 13B illustrates an orientation of the user terminal apparatus 100 that is changed without a touch interaction when a music application is executed. If the orientation of the user terminal apparatus 100 is changed without the touch interaction, the processor 120 may display a UI indicating a time in the sub display area 20. However, this is merely an embodiment, and the processor 120 may display another UI and may not provide information in the sub display area 20.

FIG. 13C illustrates an operation performed if the touch interaction as shown in FIG. 13A is input, and an orientation of the user terminal apparatus 100 is changed when a music application is executed. Therefore, the processor 120 may display a UI, which is displayed in the main display area 10, in the sub display area 20. The processor 120 may extract merely an important element from the UI displayed in the main display area 10 and display the extracted element in the sub display area 20. Alternatively, the processor 120 may display a UI, which is provided from an application executed in the main display area 10, in the sub display area 20.

If the user terminal apparatus 100 rotates at a preset angle or more in a particular orientation, the processor 120 may determine that the orientation of the user terminal apparatus 100 is changed. For example, if the user terminal apparatus 100 rotates at an angle of 90° or more, the processor 120 may determine that the orientation of the user terminal apparatus 100 is changed and perform a corresponding function.

A music application has been described above as being executed for convenience but is not limited thereto. For example, the processor 120 may equally operate even if a message application, an Internet application, or a music or moving image application is executed.

Also, the processor 120 may perform a corresponding operation according to the number of touch points of the main display area 10 and the sub display area 20.

The processor 120 may determine that the orientation of the user terminal apparatus 10 is changed and perform a corresponding operation according to an operation such as a rotation movement, a swing, or the like.

Also, the processor 120 may perform a corresponding operation according to a touch interaction with one of the main display area 10 and the sub display area 20 and the change in the orientation of the user terminal apparatus 100.

Figure 14A:
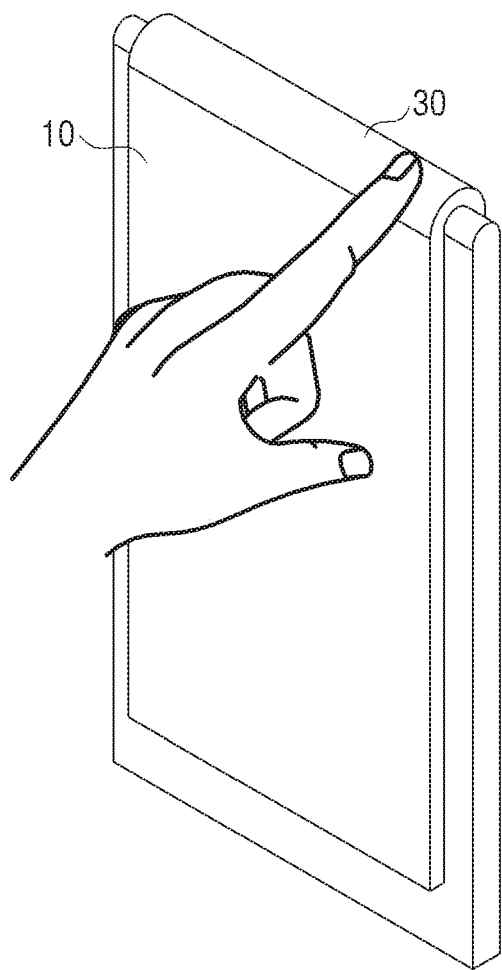
FIGS. 14A and 14B illustrate a method of using a round display area according to an embodiment of the present disclosure.
Figure 14B:
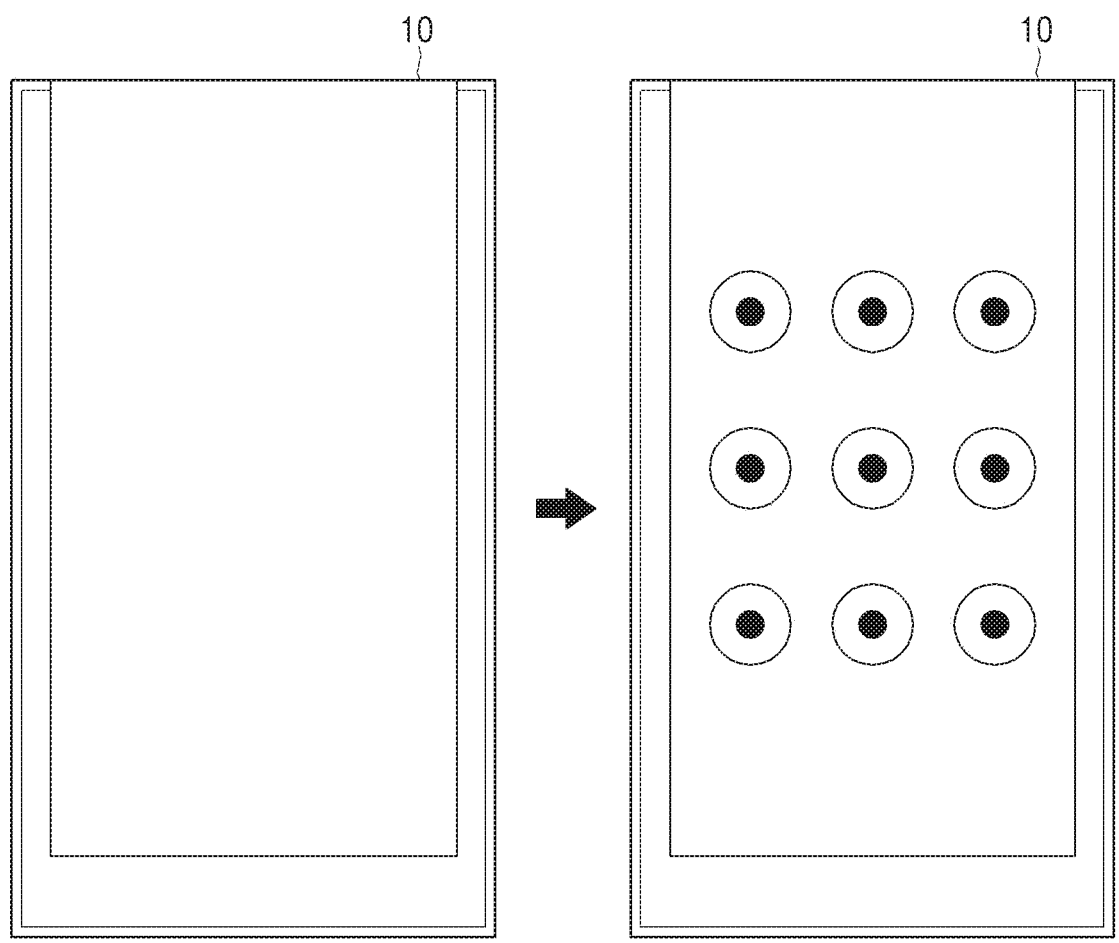

FIGS. 14A and 14B illustrate a method of using the round display area 30 according to an embodiment of the present disclosure.

Referring to FIG. 14A, the round display area 30 indicates a display area between the round display area 30 and the main display area 10. The processor 120 may perform a corresponding function according to a touch interaction input into the round display area 30.

Referring to FIG. 14B, if a touch interaction of touching the round display area 30 is input when information is not provided in the main display area 10 and the sub display area 20, the processor 120 may display a lock screen. However, the processor 120 is not limited thereto and may display a home screen or execute a particular application in the main display area 10. Alternatively, the processor 120 may not display information in the main display area 10 and the sub display area 20 and may execute a music application in the main display area 10 and the sub display area 20.

If a touch interaction is input into the round display area 30 when at least one of the main display area 10 and the sub display area 20 provides information, the processor 120 may control the user terminal apparatus 100 not to provide information any more or to enter a sleep mode.

Alternatively, the processor 120 may perform a corresponding function by combining a touch interaction with at least one of the main display area 10 and the sub display area 20 and a touch interaction with the round display area 30. In particular, the processor 120 may perform a corresponding function among functions provided from an application that is being executed.

The touch interaction with the round display area 30 may be the same as a touch interaction that may be performed in the main display area 10 or the sub display area 20. For example, the touch interaction with the round display area 30 may include a swipe interaction, an interaction having a touch area greater than or equal to a preset area, etc.

As described above, the user may perform various types of interactions by using the main display area 10, the sub display area 20, and the round display area 30. An interaction that may be used by the user will now be described in more detail.

Figure 15A:
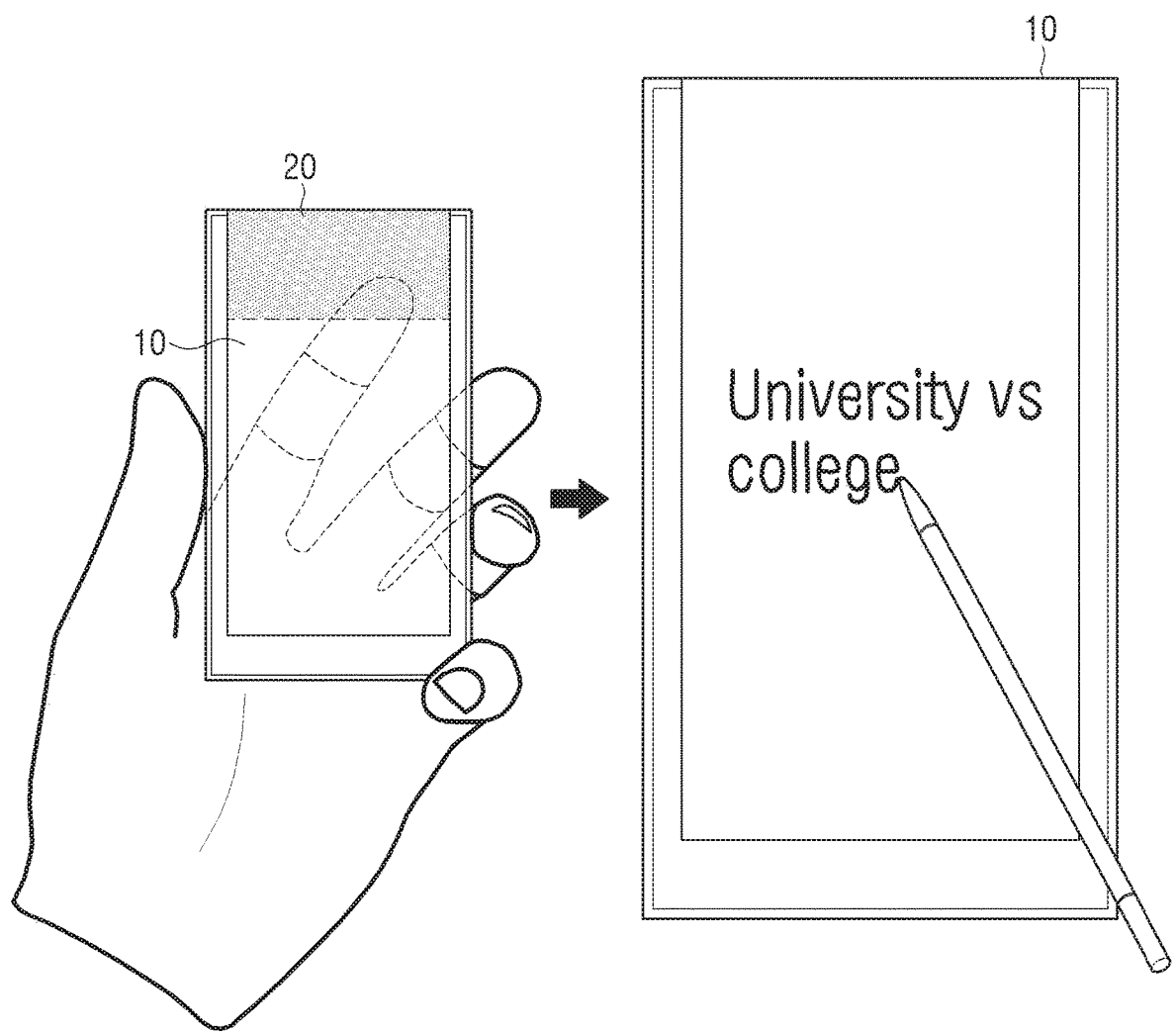
FIGS. 15A and 15B illustrate a method of setting a writing function of a writing application according to an embodiment of the present disclosure.
Figure 15B:
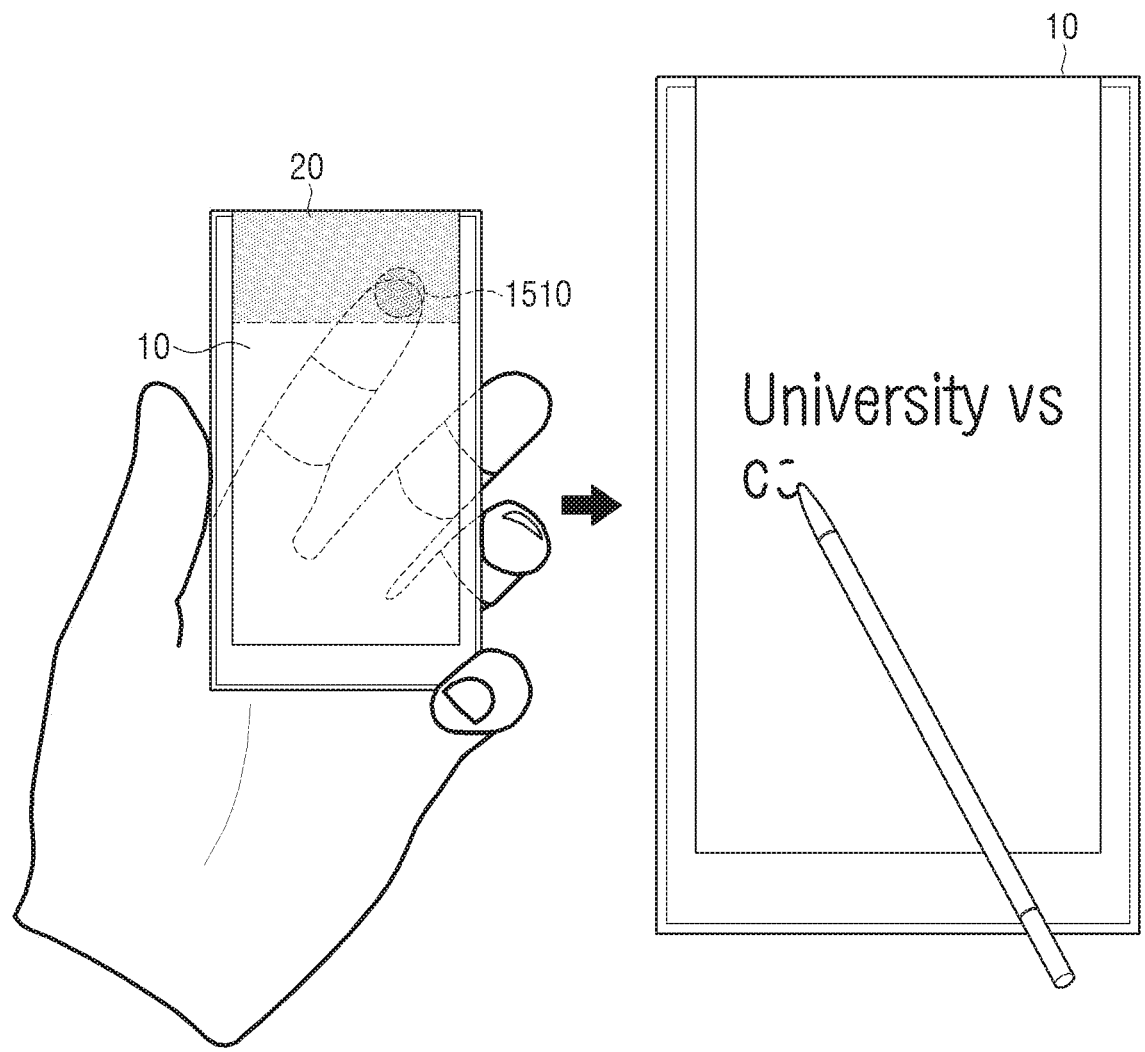

FIGS. 15A and 15B illustrate a method of setting a writing function of a writing application according to an embodiment of the present disclosure.

Referring to FIG. 15A, if a second touch interaction of touching the main display area 10 is input when the sub display area 20 is not touched while the writing application is executed, the processor 120 may perform writing according to a touch trajectory of the second touch interaction. Here, the writing application may include all applications receiving a touch trajectory and enabling a content to be displayed according to the touch trajectory, such as an application providing a simple note function, a message application, a drawing application, etc.

Alternatively, referring to FIG. 15B, if a second touch interaction of touching the main display area 10 is input when a first touch interaction of touching one point 1510 of the sub display area 20 is input while the writing application is executed, the processor 120 may erase writing pre-performed according to a touch trajectory of the second touch interaction.

However, this is merely an embodiment, and another function may be changed according to whether a touch interaction with the sub display area 20 is input. For example, if a touch interaction is input into the sub display area 20, writing may be possible. If a touch interaction is not input into the sub display area 20, writing may be impossible.

The main display area 10 is touched by using a touch pen in FIGS. 15A and 15B but is not limited thereto. For example, the main display area 10 may be touched by using a finger of the user. Also, as described with reference to FIGS. 15A and 15B, a pen function or an eraser function is executed according to a touch input into the sub display area 20, but another function may be performed. For example, if there is no touch input into the sub display area 20, the processor 120 may display a touch trajectory of the main display area 10 through a pen input. If there is a touch input into the sub display area 20, the processor 120 may display the touch trajectory of the main display area 10 through a crayon input. Alternatively, the processor 120 may change a color of a pen according to whether there is a touch input.

Figure 16:
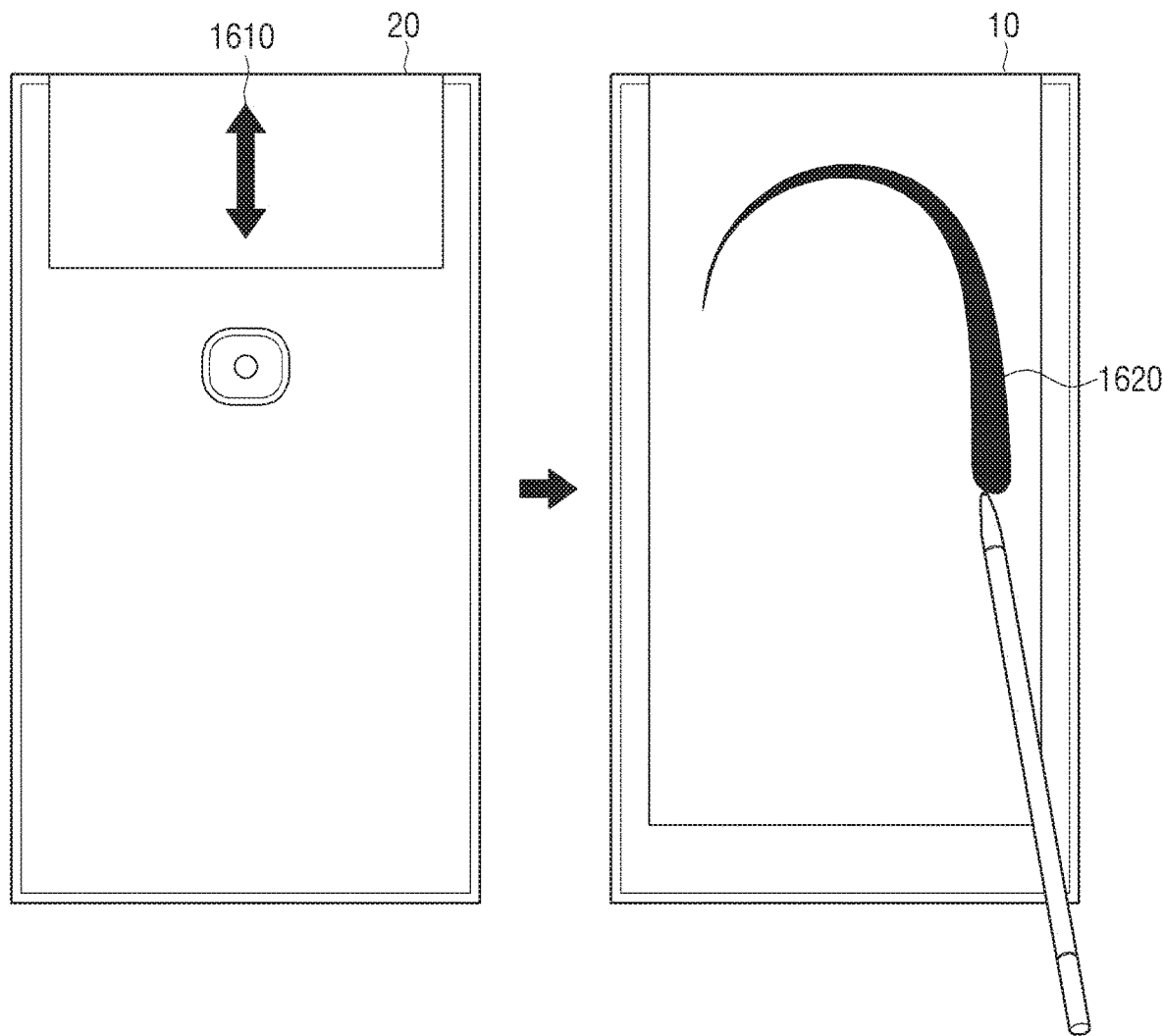
FIG. 16 illustrates a method of changing settings of a writing application according to an embodiment of the present disclosure.

FIG. 16 illustrates a method of changing settings of a writing application according to an embodiment of the present disclosure.

Referring to FIG. 16, if a first touch interaction 1610 of dragging the sub display area 20 from at least one first point to a second point while a writing application is executed, the processor 120 may perform writing by changing at least one selected from a thickness, a color, and a pen type of writing performed according to a touch trajectory 1620 of a second touch interaction of touching the main display area 10.

However, the processor 120 is not limited thereto and thus may display a UI for changing at least one selected from the thickness, the color, and the pen type of the writing in the main display area 10 according to a touch interaction of the sub display area 20.

If a writing application is used when the user terminal apparatus 100 is put on the floor, the processor 120 may change at least one selected from the thickness, the color, and the pen type of the writing by using the round display area 30.

Figure 17A:
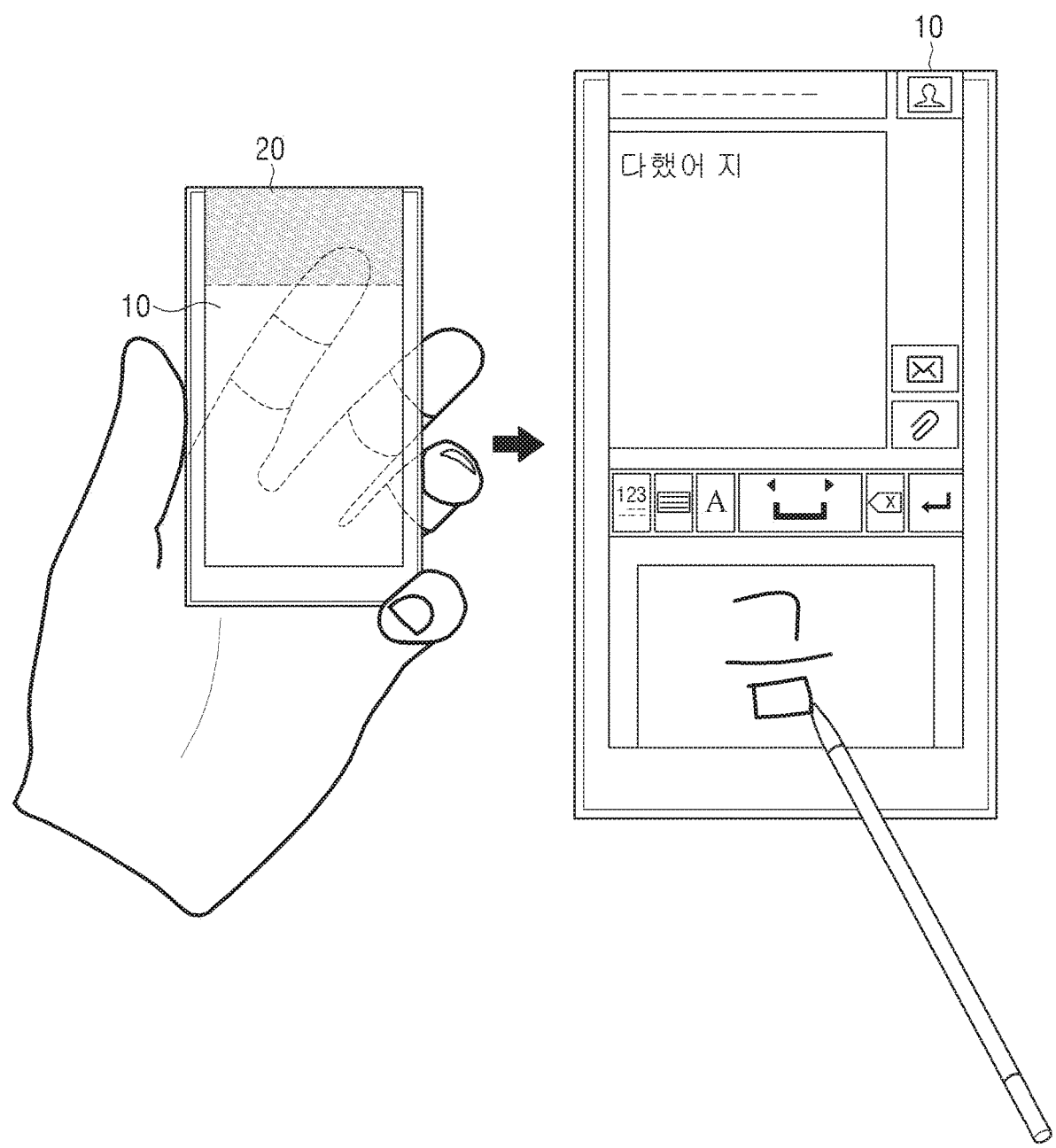
FIGS. 17A and 17B illustrate a method of changing settings of a message application according to an embodiment of the present disclosure.
Figure 17B:
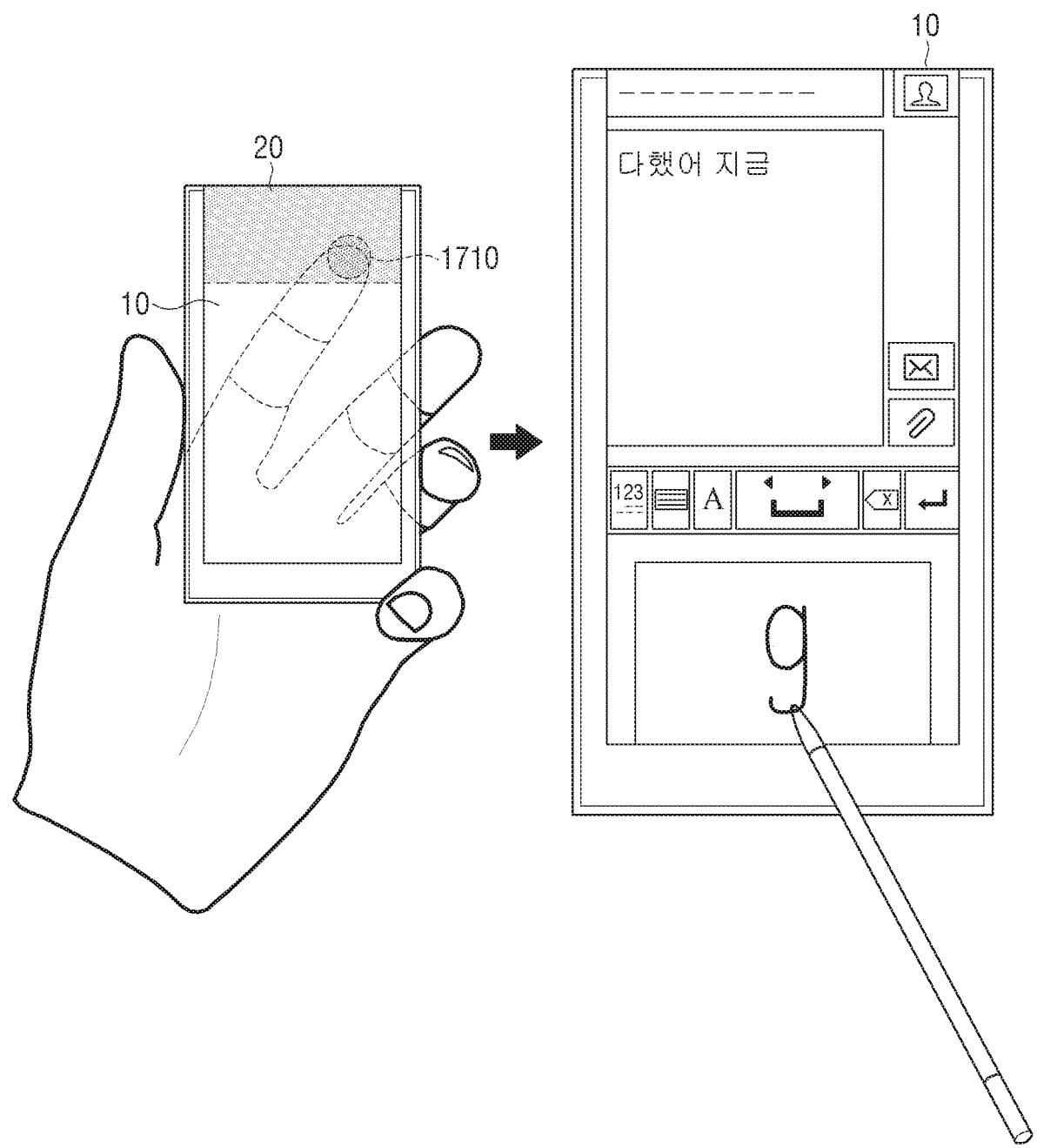

FIGS. 17A and 17B illustrate a method of changing settings of a message application according to an embodiment of the present disclosure.

Referring to FIG. 17A, if a second touch interaction of touching the main display area 10 is input when the sub display area 20 is not touched while the message application is executed, the processor 120 may perform writing according to a touch trajectory of the second touch interaction. The processor 120 may recognize characters according to a writing trajectory and recognize merely Korean alphabets in consideration of a status of the sub display area 20 that is not touched.

Alternatively, as shown in FIG. 17B, if a second touch interaction of touching the main display area 10 is input when a first touch interaction of touching one point 1710 of the sub display area 20, the processor 120 may perform writing according to a touch trajectory of the second touch interaction. Also, the processor 120 may recognize merely alphabets corresponding to the writing trajectory in consideration of a status of the sub display area 20 that is touched. In other words, the processor 120 may determine types of characters corresponding to the writing trajectory according to whether the sub display area 20 is touched.

Figure 18:
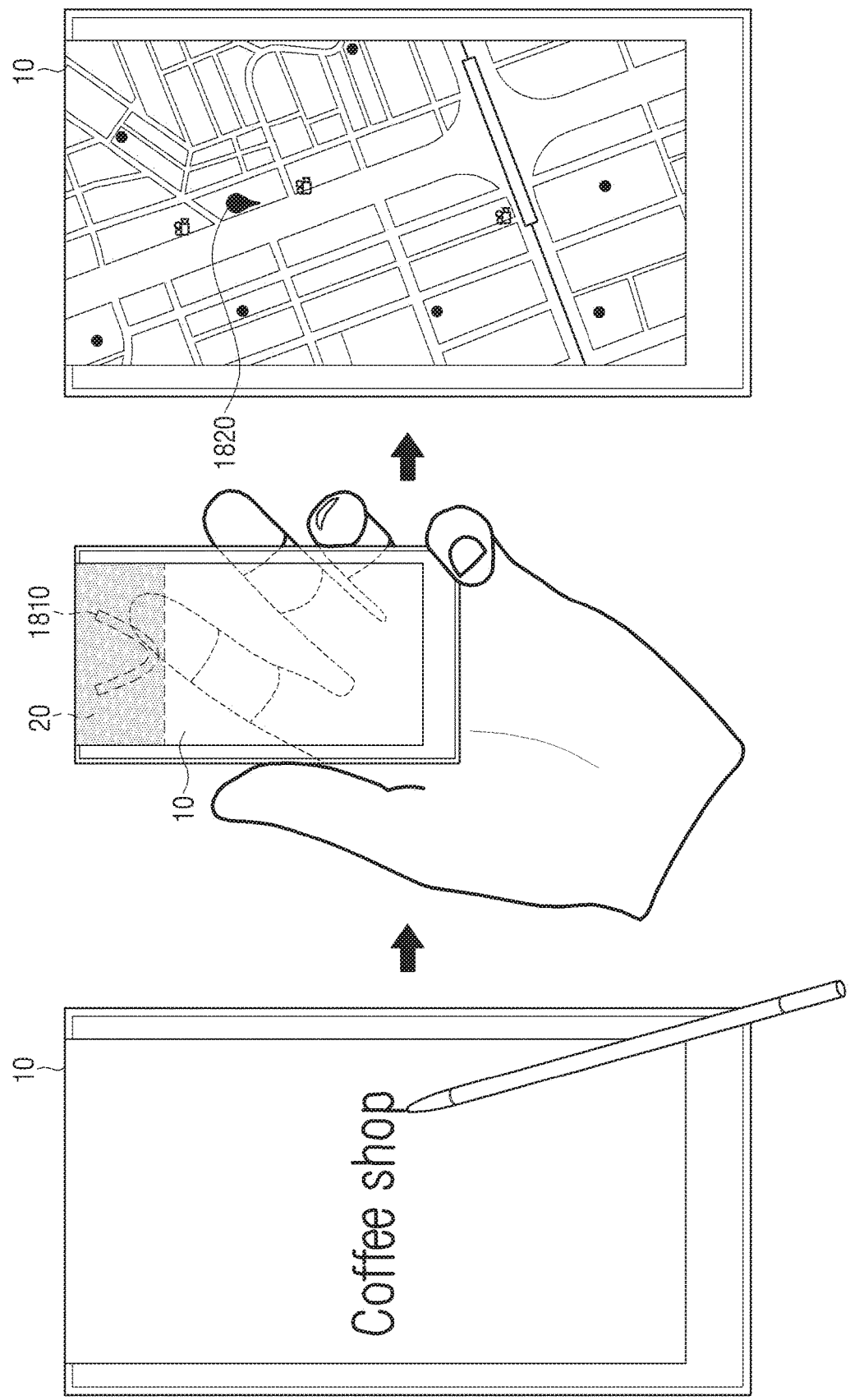
FIG. 18 illustrates a method of executing a writing recognition function according to an embodiment of the present disclosure.

FIG. 18 illustrates a method of executing a writing recognition function according to an embodiment of the present disclosure.

Referring to FIG. 18, if a first touch interaction of touching the main display area 10 is input, and a second touch interaction of touching the sub display area 20 with a preset gesture while a writing application is executed, the processor 120 may perform a corresponding function by recognizing writing performed according to a touch trajectory of the first touch interaction. For example, if writing "Coffee shop" is recognized in the main display area 10, and a second touch interaction of touching the sub display area 20 with a preset gesture 1810 is input, the processor 120 may display a graphical UI (GUI) 1820 indicating a map and a location of the writing "Coffee shop" by recognizing the writing "Coffee shop".

Figure 19A:
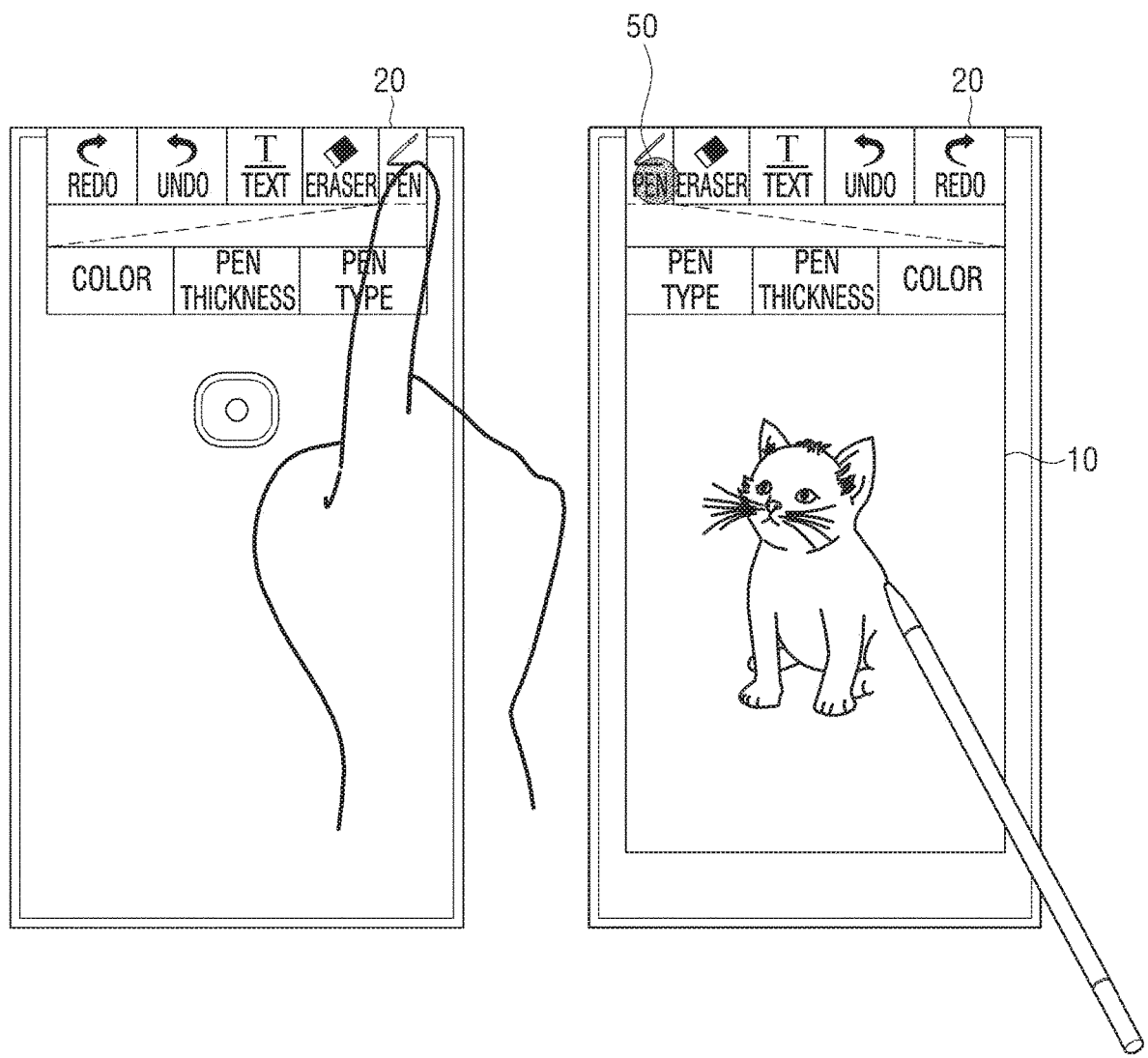
FIGS. 19A to 19C illustrate an operation performed according to a touch input into a sub display area according to an embodiment of the present disclosure.
Figure 19B:
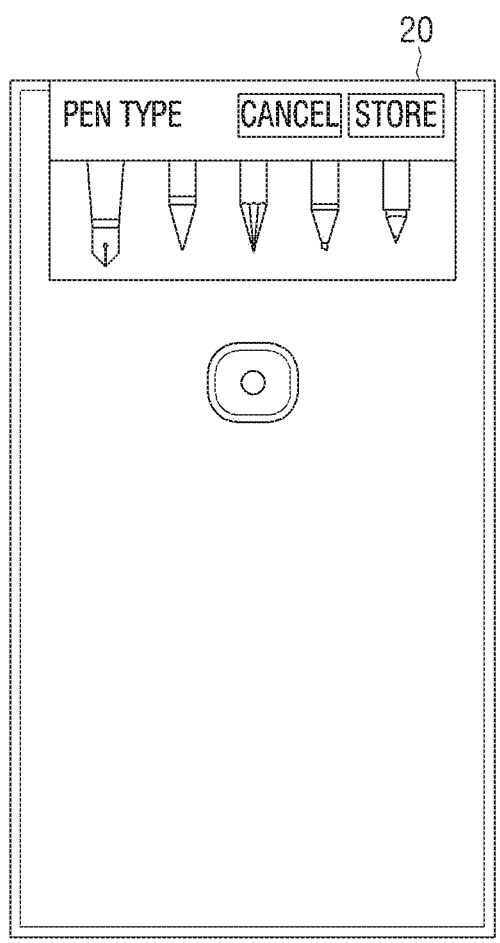
Figure 19C:
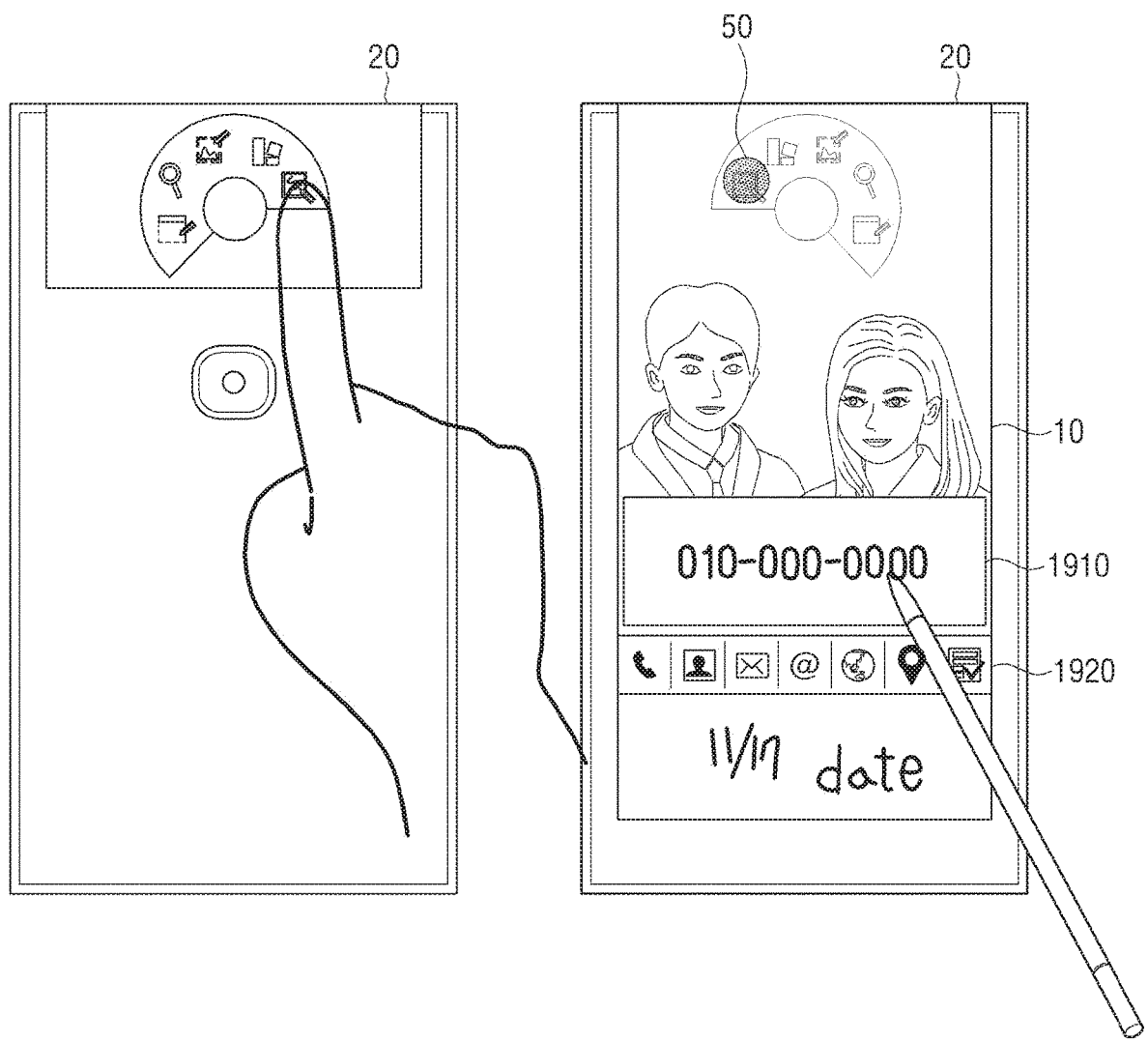

FIGS. 19A to 19C illustrate operations performed according to touch inputs into a sub display area according to an embodiment of the present disclosure.

Referring to FIG. 19A, the processor 120 may display a UI indicating a function of providing a writing application in the sub display area 20. If a preset touch input is received on the sub display area 20, the processor 120 may display a UI, which is displayed in the sub display area 20, in the main display area 10.

The processor 120 may overlay the UI displayed in the sub display area 20 on the main display area 10. The processor 120 may display the UI displayed in the sub display area 20 in the main display area 10 as it is seen or may make the UI symmetric and display the symmetric UI in the main display area 10. Alternatively, the processor 120 may make an UI element of the UI displayed in the sub display area 20 opaque and make the other area transparent and then display the opaque UI element and the transparent area in the main display area 10.

The processor 120 may display a UI including functions of "redo", "undo", "text", "eraser", "pen", etc. provided from a writing application in the sub display area 20. If a user touches the sub display area 20, the processor 120 may display a UI provided from the writing application in the main display area 10. Also, if the user sees the UI displayed in the main display area 10, the user may perform a function provided from the writing application by touching the sub display area 20. In other words, the user may perform a particular function by touching the sub display area 20 with another hand gripping the user terminal apparatus 100, with performing writing, etc. in the main display area 10.

If the user touches the sub display area 20, the processor 120 may not provide the UI displayed in the sub display area 20 anymore. Alternatively, the processor 120 may not display the UI in the sub display area 20. If the user touches the sub display area 20 when the UI is not displayed in the sub display area 20, the processor 120 may overlay and display a UI related to an application, which is being executed in the main display area 10, on the main display area 10.

The processor 120 may display a point touched on the sub display area 20 by the user as a GUI 50 in the main display area 10. The GUI 50 may pass through the user terminal apparatus 100 at the touch point of the sub display area 20 to be displayed in the main display area 10.

The processor 120 may display a detailed menu according to points touched on the sub display area 20 by the user. For example, if a pen is touched in the UI provided from the writing application, the processor 120 may additionally provide a UI for selecting a pen type, a pen thickness, and a color.

Alternatively, referring to FIG. 19B, the processor 120 may display a new UI. For example, if the user touches the pen type in FIG. 19A, the processor 120 may change and display a UI indicating the pen type.

FIG. 19C illustrates an operation performed by using an air command function. The air command function may refer to a function of providing five menus of an air command if a pen is taken close to a screen to click a pen button. The function may greatly provide menus such as an action memo, scrapbook, write after capture, S finger, a pen window, etc.

The action memo is a function of immediately searching for a call or a map if a phone number, an address, or the like is written, and a connection button is pressed. The scrapbook is a function of scrapping YouTube images, articles, images, etc. and storing the scrapped YouTube images, articles, images, etc. according to categories. The write after capture is a function of making a memo or performing simple editing on a screen. Also, the S finder is a function of finding data in a portable phone by inputting merely a search word and simultaneously working on other applications in a pen window by executing the other applications in a window size in the pen window.

Referring to FIG. 19C, while one is selected and executed from menus provided by the air command function, the processor 120 may additionally select and execute another one from the menus. For example, if the write after capture is executed, the processor 120 may receive writing "11/17 date" from the user and execute the action memo function. Here, if the user touches the sub display area 20, the processor 120 may overlay and display the air command function on the main display area 10. In other words, the user may execute the air command function by touching the sub display area 20 without a pen.

If the action memo function is executed when the write after capture is executed, the processor 120 may display an action memo UI 1910 and an action memo execution UI 1920. The processor 120 may also execute a function selected from the action memo execution UI 1920 by using writing performed in the action memo UI 1910. If the action memo function is completely executed, the processor 120 may return to the write after capture that is executed before the action memo function is executed.

Figure 20A:
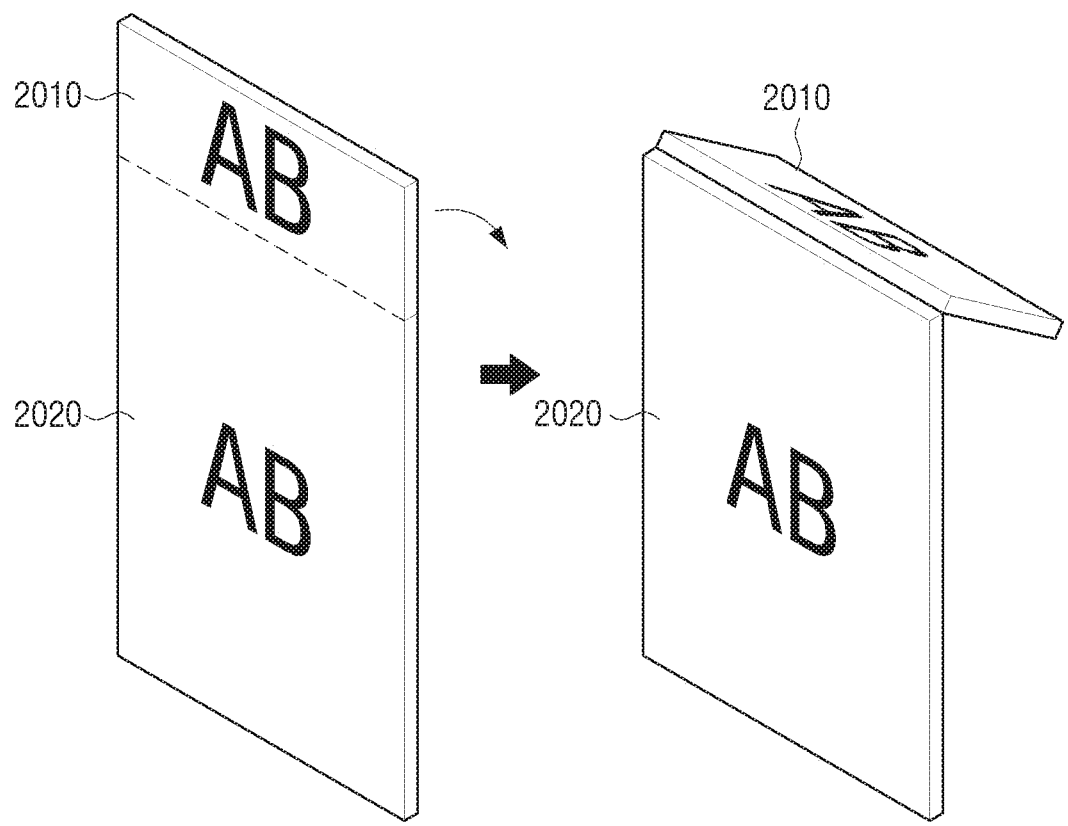
FIGS. 20A and 20B illustrate a configuration of a display according to an embodiment of the present disclosure.
Figure 20B:
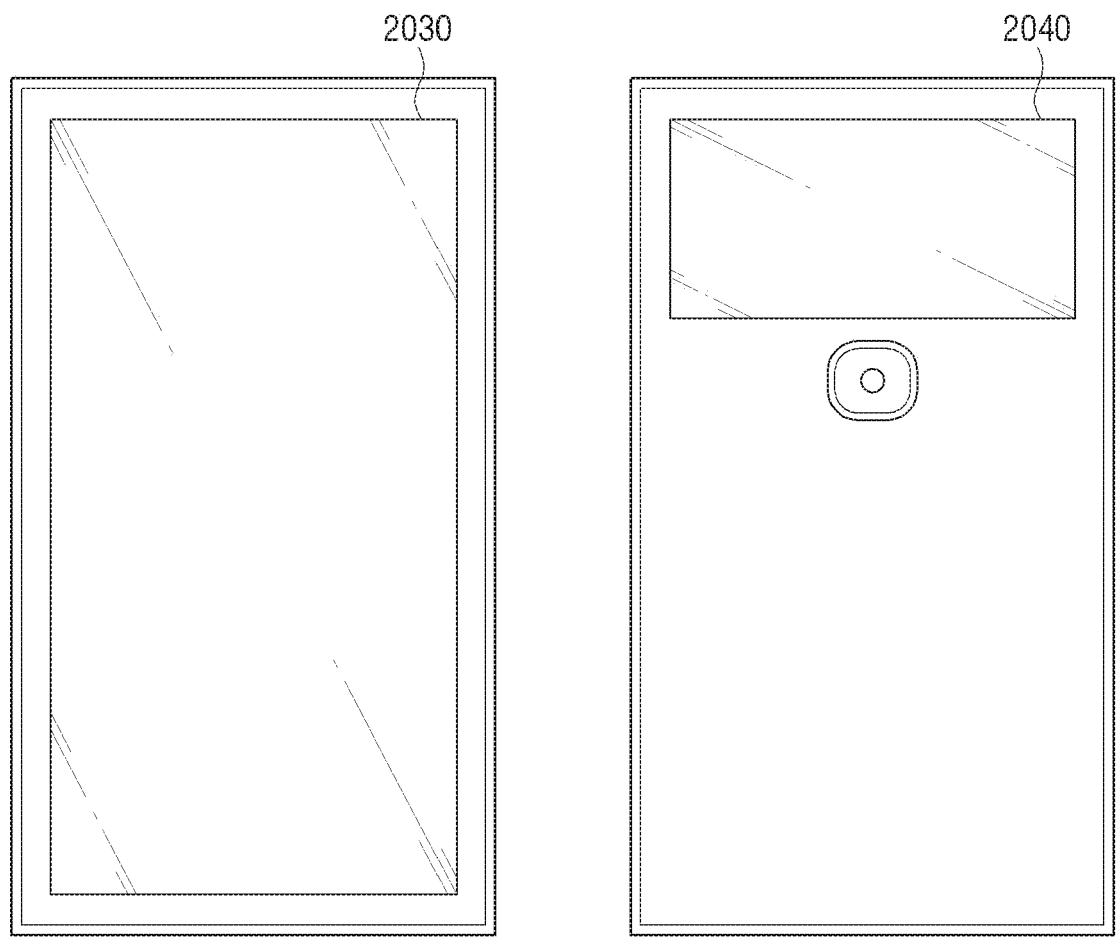

FIGS. 20A and 20B illustrate a configuration of a display according to an embodiment of the present disclosure.

FIG. 20A illustrates a flexible display. A user may fold and use the flexible display. In this case, an area 2010 that is folded upside down corresponds to the sub display area 20, and an area 2020 that is not folded corresponds to the main display area 10. If a touch input into the area 2010 is not received, the flexible display may display a UI, which is displayed in the area 2010, in the area 2020.

A dimension of the area 2010 is smaller than a dimension of the area 2020 in FIG. 20A but is not limited thereto. For example, the user may precisely fold and use the flexible display in half.

Except for the round display area 20 of the above embodiments, most embodiments may be applied to the flexible display, and thus repeated descriptions are omitted. However, if the user forms the round display area 30 by folding the flexible display two times, the embodiment of the round display area 30 may be applied.

FIG. 20B illustrates the user terminal apparatus 100 including a plurality of displays displayed on front and back surfaces thereof. In this case, a front display 2030 corresponds to the main display area 10, and a back display 2040 corresponds to the sub display area 20. Except for the round display area 30 of the above-described embodiments, most embodiments may be applied to the user terminal apparatus 100 including the plurality of displays displayed on the front and back surfaces, and thus repeated descriptions are omitted.

Figure 21:
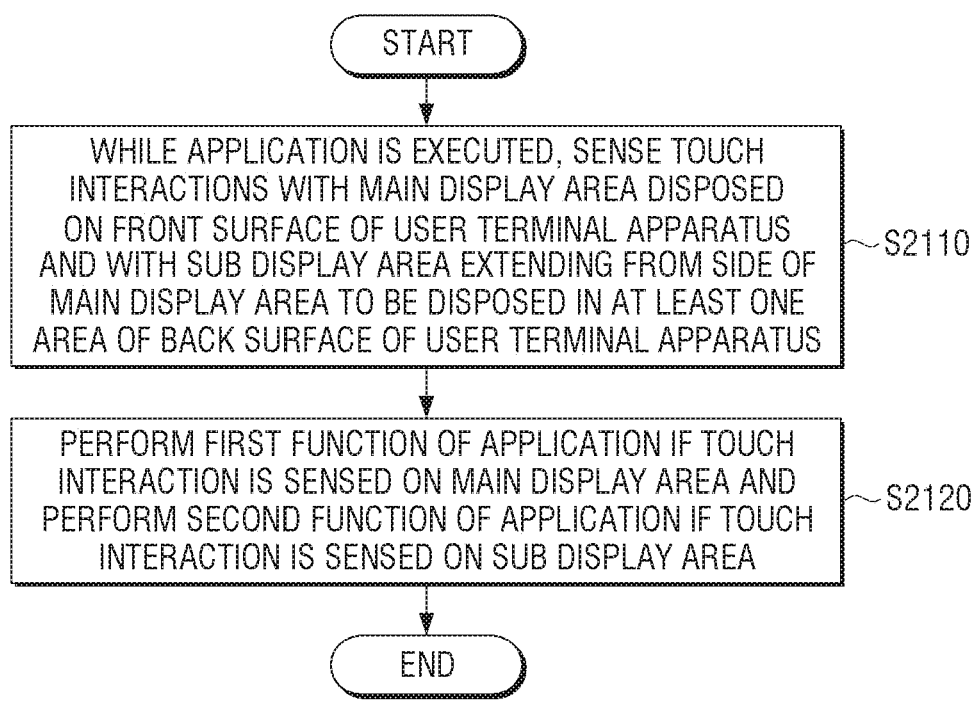
FIG. 21 is a flowchart of a method of controlling a user terminal apparatus according to an embodiment of the present disclosure.

FIG. 21 is a flowchart of a method of controlling a user terminal apparatus according to an embodiment of the present disclosure.

Referring to FIG. 21, in operation S2110, while an application is executed, a touch interaction with a main display area and a touch interaction with a sub display area are sensed, wherein the main display area is disposed on a front surface of the user terminal apparatus, and the sub display area extends from a side of the main display area to be disposed in at least one area of a back surface of the user terminal apparatus. In operation S2120, a first function of the application is performed if the touch interaction is sensed on the main display area, and a second function of the application is performed if the touch interaction is sensed on the sub display area.

Also, in operation S2110, a swipe interaction of dragging at least one of the main display area and the sub display area from a first point to a second point may be performed. In operation S2120, a function corresponding to an orientation of the swipe interaction may be performed.

In operation S2110, a first touch interaction of touching one point of the main display area and a second touch interaction of touching one point of the sub display area may be sensed. In operation S2120, a function corresponding to at least one selected from the point at which the first touch interaction is sensed and the point at which the second touch interaction is sensed may be performed.

In operation S2110, a first touch interaction of touching one point of the sub display area and a second touch interaction that is a preset gesture input into the main display area may be sensed. In operation S2120, a function corresponding to a gesture type of the second touch interaction may be performed.

In operation S2110, a first touch interaction of touching one point of the sub display area and a second touch interaction of touching at least two points of the main display area may be sensed. In operation S2120, a function corresponding to the number of points touched by the second touch interaction may be performed.

In operation S2120, if an orientation of the user terminal apparatus is changed when a first touch interaction of touching one point of the main display area and a second touch interaction of touching one point of the sub display area are input, a function corresponding to the first and second interactions and the change in the orientation of the user terminal apparatus may be performed.

In operation S2120, if a second touch interaction of touching the main display area is input when a first touch interaction of touching one point of the sub display area while a writing application is executed, writing pre-performed according to a touch trajectory of the second touch interaction may be erased.

In operation S2120, if a first touch interaction of dragging the sub display area from at least one first point to a second point when a writing application is executed, writing may be performed by changing at least one selected from a thickness, a color, and a pen type of writing performed according to a touch trajectory of a second touch interaction.

In operation S2120, if a first touch interaction of touching the main display area, and a second touch interaction of touching the sub display area with a preset gesture is input while the writing application is executed, a corresponding function may be performed by recognizing writing performed according to a touch trajectory of the first touch interaction.

According to various embodiments of the present disclosure as described above, a user terminal apparatus may provide various types of touch interactions by using displays disposed on front and back surfaces thereof. Therefore, applicability and convenience of the user terminal apparatus may be increased.

A home screen, a message application, an Internet application, etc. have described above but are not limited thereto. For example, operations may be performed for other applications, such as a navigation application, etc., according to various touch interactions.

Even if touch interactions are input on a main display area and a sub display area in reverse, similar operations may be performed.

Functions corresponding to various types of touch interactions described above may be set in a process of developing applications but may be directly set by a user. Also, the user may generate a new type of touch interaction, and map and use a corresponding operation.

Operations corresponding to applications of most embodiments have been described above but are not limited thereto. For example, if a particular touch interaction is input when a music application is executed, a processor may execute an Internet application unrelated to the music application.

A touch interaction with a main display area and a touch interaction with a sub display area have been described above as being simultaneously input in most embodiments but are not limited thereto. For example, even if a touch interaction is input into one display area, and touch interaction is input into the other display area within a preset time, the same operation may be performed like when the touch interactions are simultaneously input.

Methods according to various embodiments as described above may be programmed and stored on various types of storage media. Therefore, the methods according to the above-described embodiments may be embodied in various types of electronic apparatuses that execute storage media.

In detail, there may be provided a non-transitory computer readable medium that stores a program sequentially performing a control method as described above.

The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact discs (CDs), digital versatile discs (DVDs), hard disks, Blu-ray discs, universal serial buses (USBs), memory cards, and ROM.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A user terminal apparatus comprising:
   a display comprising:
      a first display area disposed on a front surface of the user terminal apparatus,
      a second display area extending from a side of the first display area and disposed in at least one area of a back surface of the user terminal apparatus, and
      a third display area located between the first display area and the second display area; and
   at least one processor configured to:
      detect a drag input on the first display area towards the third display area while an application is being executed, first information of the application is displayed on the first display area, and second information of the application is displayed on the second display area, and display to move the first information of the application, that is displayed on the first display area, to the second display area based on the drag input, and move the second information, that is displayed on the second display area, to the first display area based on the drag input.

2. The user terminal apparatus of claim 1, further comprising at least one of:

a pen recognition panel disposed on at least one of the first display area or the second display area, the pen recognition panel being configured to sense a pen gesture input of a touch pen; or a touch panel disposed on at least one of the first display area or the second display area, the touch panel being configured to sense a finger gesture input of a finger, wherein the at least one processor is further configured to perform a function of the application corresponding to an input type and an input area.

3. The user terminal apparatus of claim 1, wherein a touch interaction sensed on the first display area and a touch interaction sensed on the second display area are each at least one of a pen gesture input or a finger gesture input.

4. The user terminal apparatus of claim 1, wherein, based on sensing a swipe interaction of dragging in at least one of the first display area or the second display area, from a first point to a second point, the at least one processor is further configured to:

perform a function of the application, based on a first orientation of the swipe interaction, and display another application, based on a second orientation of the swipe interaction.

5. The user terminal apparatus of claim 1, wherein, based on sensing a first touch interaction of touching a point of the first display area and a second touch interaction of touching a point of the second display area, the at least one processor is further configured to perform at least one function corresponding to at least one icon selected from one or more of the point of the first display area at which the first touch interaction is sensed or the point of the second display area at which the second touch interaction is sensed.

6. The user terminal apparatus of claim 1, wherein, based on sensing a first touch interaction of touching a point of the second display area and a second touch interaction of a preset gesture input into the first display area, the at least one processor is further configured to perform a function corresponding to a gesture type of the second touch interaction.

7. The user terminal apparatus of claim 1, wherein, based on sensing a first touch interaction of touching a point of the second display area and a second touch interaction of touching at least two points of the first display area, the at least one processor is further configured to perform a function corresponding to a number of points touched by the second touch interaction.

8. The user terminal apparatus of claim 1, wherein, based on a change in orientation of the user terminal apparatus in response to receiving an input of a first touch interaction of touching a point of the first display area and a second touch interaction of touching a point of the second display area, the at least one processor is further configured to perform a function corresponding to the change in the orientation.

9. The user terminal apparatus of claim 1, wherein, based on a second touch interaction of touching the first display area, being input in response to receiving an input of a first touch interaction of touching a point of the second display area in response to a writing application being executed, the at least one processor is further configured to erase writing pre-performed according to a touch trajectory of the second touch interaction.

10. The user terminal apparatus of claim 1, wherein, based on receiving an input of a first touch interaction of dragging from at least one first point to a second point in the second display area in response to a writing application being executed, the at least one processor is further configured to perform writing by changing at least one selection from one of a thickness, a color, or a pen type of writing performed according to a touch trajectory of a second touch interaction.

11. The user terminal apparatus of claim 1, wherein, based on receiving an input of a first touch interaction of touching the first display area and a second touch interaction of touching the second display area with a preset gesture in response to a writing application being executed, the at least one processor is further configured to perform a function which is selected based on recognizing writing performed according to a touch trajectory of the first touch interaction.

12. The user terminal apparatus of claim 1, wherein a first function of the application, which is sensed on the first display area, is a control of a set value of one of a play time or a volume, and wherein a second function of the application, which is sensed on the second display area, is the control of the set value of the one of the play time or the volume which includes increased precision in adjusting the set value relative to the first function.

13. The user terminal apparatus of claim 1, wherein the displaying to move the first information from the first display area to the second display area includes displaying a background on the first display area that is displayed before and after the first information is moved.

14. The user terminal apparatus of claim 1, wherein the at least one processor is further configured to:

remove the second information from the second display area based on the user drag input.

15. The user terminal apparatus of claim 1, wherein the display is configured to:

sense a touch interaction, another touch interaction, and the drag input with the first display area.

16. The user terminal apparatus of claim 1, wherein the second display area comprises a smaller surface area than the first display area, and wherein the first display area and the second display area display information of a same application.

17. A method of controlling a user terminal apparatus comprising a display, the display comprising: a first display area disposed on a front surface of the user terminal apparatus; a second display area extending from a side of the first display area and disposed in at least one area of a back surface of the user terminal apparatus; and a third display area located between the first display area and the second display area, the method comprising:

detecting a drag input on the first display area towards the third display area while an application is being executed, first information of the application is displayed on the first display area, and second information of the application is displayed on the second display area;

displaying to move the first information of the application, that is displayed on the first display area, to the second display area based on the drag input; and moving the second information, that is displayed on the second display area, to the first display area based on the drag input.

18. The method of claim 17, further comprising:

sensing a swipe interaction of dragging inside of at least one of the first display area or the second display area, the dragging being from at least one first point to a second point;

performing a function of the application, based on a first orientation of the swipe interaction; and displaying another application, based on a second orientation of the swipe interaction.

19. The method of claim 17, further comprising:

sensing a first touch interaction of touching a point of the first display area and sensing a second touch interaction of touching a point of the second display area; and performing a function corresponding to at least one point selected from the point at which the first touch interaction is sensed or the point at which the second touch interaction is sensed.

20. The method of claim 17, further comprising:

sensing a first touch interaction of touching a point of the second display area and sensing a second touch interaction comprising a preset gesture input into the first display area; and performing a function corresponding to a gesture type of the second touch interaction.

21. The method of claim 17, further comprising:

sensing a first touch interaction of touching a point of the second display area and sensing a second touch interaction of touching at least two points of the first display area; and performing a function corresponding to a number of points touched by the second touch interaction.

22. The method of claim 17, further comprising:

based on an orientation of the user terminal apparatus being changed in response to receiving an input of a first touch interaction of touching a point of the first display area and a second touch interaction of touching a point of the second display area, performing a function corresponding to the first and second touch interactions and the change in the orientation.

23. The method of claim 17, further comprising:

based on a second touch interaction of touching the first display area, the second touch interaction being input in response to a first touch interaction of touching a point of the second display area, the first touch interaction being input in response to a writing application being executed, erasing writing pre-performed according to a touch trajectory of the second touch interaction.

24. The method of claim 17, further comprising:

performing writing by changing at least one selected from a thickness, a color, or a pen type of writing performed according to a touch trajectory of a second touch interaction of touching the first display area in response to receiving an input of a first touch interaction of dragging the second display area from at least one first point to a second point in response to a writing application being executed.

25. The method of claim 17, further comprising:

performing a function selected based on recognizing writing performed according to a touch trajectory of a first touch interaction based on receiving an input of the first touch interaction of touching the first display area and a second touch interaction of touching the second display area with a preset gesture in response to a writing application being executed.

* * * * *